(12) United States Patent
Bin Sediq

(10) Patent No.: US 11,051,356 B2
(45) Date of Patent: Jun. 29, 2021

(54) SOFT DISCONTINUOUS RECEPTION (SOFT DRX)

(71) Applicant: Telefonaktiebolaget LM Ericsson (publ), Stockholm (SE)

(72) Inventor: Akram Bin Sediq, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/310,365

(22) PCT Filed: Jun. 17, 2016

(86) PCT No.: PCT/IB2016/053623
§ 371 (c)(1),
(2) Date: Dec. 14, 2018

(87) PCT Pub. No.: WO2017/216613
PCT Pub. Date: Dec. 21, 2017

(65) Prior Publication Data
US 2019/0335528 A1 Oct. 31, 2019

(51) Int. Cl.
*H04J 3/08* (2006.01)
*H04W 76/28* (2018.01)
(Continued)

(52) U.S. Cl.
CPC ....... *H04W 76/28* (2018.02); *H04W 52/0216* (2013.01); *H04W 72/042* (2013.01); *H04L 5/0007* (2013.01)

(58) Field of Classification Search
None
See application file for complete search history.

(56) References Cited

U.S. PATENT DOCUMENTS

| 8,169,957 B2 | 5/2012 | Damnjanovic |
| 2008/0186892 A1 | 8/2008 | Damnjanovic |

(Continued)

FOREIGN PATENT DOCUMENTS

| EP | 2667667 B1 | 9/2015 |
| WO | 2010078365 A1 | 7/2010 |

(Continued)

OTHER PUBLICATIONS

Author Unknown, "Technical Specification Group Services and System Aspects; Study on system impacts of extended Discontinuous Reception (DRX) cycle for power consumption optimization (Release 13)," Technical Report 23.770, Version 13.0.0, 3GPP Organizational Partners, Sep. 2015, 42 pages.

(Continued)

*Primary Examiner* — Phuongchau Ba Nguyen
(74) *Attorney, Agent, or Firm* — Patent Portfolio Builders, PLLC

(57) ABSTRACT

Embodiments of the present disclosure are related to achieving better tradeoffs between battery saving and latency to, e.g., support ultra-low latency applications by introducing soft Discontinuous Reception (DRX). In some embodiments, a method of operation of a wireless device in a wireless communications network comprises monitoring, during a DRX awake period, two or more control channel subsets during two or more time periods within the DRX awake period, respectively. The two or more control channel subsets are different subsets of a plurality of candidate control channels. In some embodiments, the two or more time periods are two or more subframes. The candidate control channels are control channels that the wireless device is configured to monitor. The two or more control channel subsets can be selected to, e.g., reduce latency while (Continued)

not increasing energy consumption as compared to legacy DRX.

14 Claims, 15 Drawing Sheets

(51) Int. Cl.
*H04W 52/02* (2009.01)
*H04W 72/04* (2009.01)
*H04L 5/00* (2006.01)

(56) References Cited

U.S. PATENT DOCUMENTS

| | | | |
|---|---|---|---|
| 2008/0232310 | A1 | 9/2008 | Xu |
| 2009/0262648 | A1 | 10/2009 | Chun et al. |
| 2009/0264164 | A1 | 10/2009 | Chun et al. |
| 2010/0034145 | A1 | 2/2010 | Kim et al. |
| 2010/0110897 | A1 | 5/2010 | Chun et al. |
| 2011/0002281 | A1* | 1/2011 | Terry ............ H04W 52/0216 370/329 |
| 2011/0105069 | A1 | 5/2011 | Gaal et al. |
| 2012/0178445 | A1* | 7/2012 | Dalsgaard ........ H04W 52/0216 455/434 |
| 2013/0107723 | A1 | 5/2013 | Dhanda et al. |
| 2013/0235780 | A1 | 9/2013 | Kim et al. |
| 2013/0301421 | A1 | 11/2013 | Yi et al. |
| 2014/0169246 | A1 | 6/2014 | Chui et al. |
| 2016/0073284 | A1 | 3/2016 | Qian et al. |
| 2016/0135247 | A1* | 5/2016 | Ozturk ............ H04W 36/0016 455/436 |

FOREIGN PATENT DOCUMENTS

| | | | | |
|---|---|---|---|---|
| WO | 2011021152 | A1 | 2/2011 | |
| WO | 2012139272 | A1 | 10/2012 | |
| WO | 2016064048 | A1 | 4/2016 | |
| WO | WO-2016064048 | A1 * | 4/2016 | ........ H04W 52/0216 |

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.4.0, 3GPP Organizational Partners, Dec. 2014, 124 pages.
Author Unknown, "Technical Specification Group Radio Access Network; Evolved Universal Terrestrial Radio Access (E-UTRA); Physical layer procedures (Release 12)," Technical Specification 36.213, Version 12.4.0, 3GPP Organizational Partners, Dec. 2014, 228 pages.
Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.4.0, 3GPP Organizational Partners, Dec. 2014, 60 pages.
Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.1.0, 3GPP Organizational Partners, Mar. 2016, 549 pages.
Dahlman, Erik, et al., "9.1: Overall Time-Frequency Structure," 4G LTE/LTE-Advanced for Mobile Broadband (book), Chapter 9: Physical Transmission Resources, Apr. 2011, Elsevier Ltd, pp. 127-128.
Dahlman, Erik, et al., "10.4.7 Power-Control Commands," 4G LTE/LTE-Advanced for Mobile Broadband (book), Chapter 10.4 Downlink L1/L2 Control Signaling, Apr. 2011, Elsevier Ltd, p. 195.
Hoymann, Christian, et al. "A Lean Cartier for LTE," IEEE Communications Magazine, LTE Technology Update: Part 2, vol. 51, Issue 2, Feb. 2013, IEEE, pp. 74-80.
Huang, Junxian, et al., "A Close Examination of Performance and Power Characteristics of 4G LTE Networks," Proceedings of the 10th international conference on Mobile systems, applications, and services (MobiSys), Jun. 25-29, 2012, Low Wood Bay, Lake District, United Kingdom, ACM, 14 pages.
Qualcomm Technologies Inc., "LTE MTC: Optimizing LTE Advanced for Machine-Type Communications," Qualcomm Technologies, Inc. and/or its affiliated companies, Nov. 2014, 29 pages.
Ranjan, Shashi, "DRX (Discontinous Reception)" ShareTechnote, accessed Sep. 15, 2015, www.sharetechnote.com/html/MAC_LTE. html#DRX, pp. 13-16.
Stea, Giovanni, et al., "A comprehensive simulation analysis of LTE Discontinuous Reception (DRX)," Computer Networks, vol. 73, Aug. 12, 2014, Elsevier B.V., pp. 22-40.
International Search Report for International Patent Application No. PCT/IB2016/053623, dated Feb. 22, 2017, 13 pages.

\* cited by examiner

SOFT DISCONTINUOUS RECEPTION (SOFT DRX)

This application is a 35 U.S.C. § 371 national phase filing of International Application No. PCT/IB2016/053623, filed Jun. 17, 2016, the disclosure of which is incorporated herein by reference in its entirety.

TECHNICAL FIELD

The present disclosure relates to Discontinuous Reception (DRX) in a wireless communications network.

BACKGROUND

For the sake of presentation, the technical background is explained with respect to cellular networks that are implemented based on Long Term Evolution (LTE) and LTE-Advanced standards, both of which are generally referred to herein as LTE. Nevertheless, the present disclosure is generally applicable to any wireless communication network or any cellular communication network in which the wireless device supports Discontinuous Reception (DRX).

LTE Frame Structure

Orthogonal Frequency Division Multiplexing (OFDM) is used in LTE, where the radio resources are divided into OFDM symbols in the time domain and orthogonal narrow-band sub-carriers in the frequency domain. The smallest radio frequency element in LTE resources is called a Resource Element (RE). A RE consists of one OFDM symbol in time that spans 66.7 microseconds (μs) plus a normal or extended cycle prefix and one sub-carrier in frequency that spans 15 kilohertz (kHz). A RE can carry one modulation symbol. The smallest unit that can be scheduled to a User Equipment device (UE) is defined as a Physical Resource Block (PRB) pair, which consists of 12 subcarriers in frequency and two slots in time, where each slot consists of six to seven OFDM symbols. A PRB pair spans one subframe in time, which has a duration of 1 millisecond (ms).

In LTE, the base station, called an enhanced or evolved Node B (eNB), schedules downlink transmissions to UEs on a per-subframe basis. In addition to transmitting the UE traffic data, the eNB needs to transmit Downlink Control Information (DCI) to UEs, which includes information about the location of the PRB pairs allocated to the UEs in the Physical Downlink Shared Channel (PDSCH), the type of modulation and coding that the UEs need to use for decoding the UEs' traffic data, as well as other control information. In LTE Release 8, 9, and 10, DCI is conveyed only in a Physical Downlink Control Channel (PDCCH). A PDCCH is transmitted in the control region of the subframe, which is located at the beginning of the subframe (up to the first four OFDM symbols). In LTE Release 11, an enhanced PDCCH (ePDCCH) is introduced as described in Third Generation Partnership Project (3GPP) Technical Specification (TS) 36.211 V12.4.0, Section 6.8A, where DCI can also be transmitted in the data region of the subframe that carries the data traffic for UEs.

Since the UE does not know a priori whether it is scheduled in a particular subframe or not, the UE monitors the eNB downlink transmission. Since the UE does not know the precise location within the subframe of the DCI intended for the UE, the UE performs blind decoding, where the UE monitors all control channel candidates that may be assigned to the UE in the subframe. These control channel candidates are referred to as PDCCH candidates (or ePDCCH candidates), and the UE may receive DCI on any of the PDCCH candidates (or ePDCCH candidates).

Discontinuous Reception

The UE is required to monitor its serving eNB's transmission in order to know if there is downlink data intended for the UE. However, continuously monitoring the downlink channel results in high energy consumption, which reduces the battery lifetime of the UE. In order to reduce energy consumption, Discontinuous Reception (DRX) is implemented where the UE goes into predefined Awake/Sleep periods to save battery life. As used herein, the "DRX awake period" is a period of time during which a wireless device operating according to a DRX scheme is awake during a DRX cycle. In 3GPP LTE, the DRX awake period includes one or more of the following: On Duration Timer for long and short cycle, DRX Inactivity Timer, and DRX Retransmission Timer, which are defined in 3GPP TS 36.321 V12.4.0 in Section 3.1, as follows:

On Duration Timer: the number of consecutive PDCCH subframe(s) where the UE is Awake at the beginning of a DRX cycle, whether it is a long DRX cycle or a DRX short cycle, as shown in FIG. 1.

DRX Inactivity Timer: the number of consecutive PDCCH subframe(s) where the UE is Awake after the subframe within which a PDCCH indicates an initial uplink or downlink user data transmission. Upon expiry of DRX Inactivity Timer and if short DRX cycle is configured, short DRX cycle is used and DRX Short Cycle Timer specifies the number of consecutive subframe(s) where the short DRX cycle is followed.

DRX Retransmission Timer: when a retransmission is expected, this parameter denotes the number of consecutive PDCCH-subframe(s) where the UE is Awake until a downlink retransmission is received.

The Awake state can be sometimes extended longer than the On Duration Timer. For example, the Awake state may be extended longer than the On Duration Timer shown in FIG. 1 due to the detection of initial uplink or downlink transmission which activate DRX Inactivity Timer, due to the activation of short cycle if configured, due to the expectation of possible retransmission which may activate DRX Retransmission Timer, and/or during contention resolution in random access. When the UE is in the Awake state, the UE decodes all control channel candidates to determine whether there is data for the UE. For instance, for an LTE UE configured with PDCCH, the UE is expected to monitor a total of 22 PDCCH candidates (i.e., sum of numbers in the last column in Table 1 below) in every subframe where the UE is in the Awake state. The time-frequency locations of the 22 PDCCH candidates are dependent on a Radio Network Temporary Identifier (RNTI) and the subframe number; however, the number of PDCCH candidates that the UE monitor is the same (i.e., 22) in every subframe during a DRX Awake period. On the other hand, when the UE is in the Sleep state, the UE does not monitor or decode any channel, i.e., the UE goes to sleep to save battery.

TABLE 1

PDCCH candidates monitored by a UE (reproduced from 3GPP TS 36.213 V12.4.0, Table 9.1.1-1).

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

The battery gain achieved by using DRX comes at the expense of increased downlink latency, as transmission of packets that arrive at the eNB when the UE is in the Sleep state has to wait until the UE is in the Awake state. For instance, the DRX long cycle may be 320 ms and the ON Duration Timer may be 10 ms. This results in a latency of up to 310 ms for a packet that arrives at the eNB when the UE is in the Sleep state. Such latency may not be acceptable for ultra-low latency applications that are expected to be supported in next generation networks such as healthcare and emergency notification systems.

SUMMARY

Embodiments of the present disclosure are related to achieving better tradeoffs between battery saving and latency to, e.g., support ultra-low latency applications by introducing soft Discontinuous Reception (DRX). In some embodiments, a method of operation of a wireless device in a wireless communications network comprises monitoring, during a DRX awake period, two or more control channel subsets during two or more time periods within the DRX awake period, respectively. The two or more control channel subsets are different subsets of a plurality of candidate control channels. In some embodiments, the two or more time periods are two or more subframes. The candidate control channels are control channels that the wireless device is configured to monitor. The two or more control channel subsets can be selected to, e.g., reduce latency while not increasing energy consumption as compared to legacy DRX.

In some embodiments, the wireless device supports downlink Carrier Aggregation (CA), and the plurality of candidate control channels comprise candidate control channels on at least two downlink carriers. In some embodiments, a first control channel subset of the two or more control channel subsets comprise at least one candidate control channel on a first carrier of the at least two downlink carriers but not any candidate control channels on a second carrier of the at least two downlink carriers.

In some embodiments, the plurality of candidate control channels comprises a first plurality of candidate Physical Downlink Control Channels (PDCCHs) and a second plurality of candidate enhanced PDCCHs (ePDCCHs). Further, the two or more control channel subsets comprise a first control channel subset that comprises at least some of the first plurality of candidate PDCCHs but not any of the second plurality of candidate ePDCCHs, and a second control channel subset that comprises at least some of the second plurality of candidate ePDCCHs but not any of the first plurality of candidate PDCCHs.

In some embodiments, at least one of the two or more control channel subsets comprises one or more candidate control channels that utilize a low complexity modulation and coding scheme. In some embodiments, the one or more candidate control channels that utilize a low complexity modulation and coding scheme are candidate control channels that utilize a modulation and coding scheme that is sufficient to carry only data to enable the wireless device to activate a DRX Inactivity Timer or to switch to legacy DRX.

In some embodiments, the two or more control channel subsets consist of two control channel subsets.

In some embodiments, the two or more control channel subsets comprise a first control channel subset that comprises all of the plurality of candidate control channels and a second control channel subset that comprises less than all of the plurality of candidate control channels.

In some embodiments, monitoring the two or more control channel subsets during the two or more time periods within the DRX awake period, respectively, comprises determining a first control channel subset for a first time period within the DRX awake period, monitoring candidate control channels in the first control channel subset during the first time period for a downlink control channel transmission to the wireless device, determining a second control channel subset for a second time period within the DRX awake period, and monitoring candidate control channels in the second control channel subset during the second time period for a downlink control channel transmission to the wireless device.

In some embodiments, the method further comprises receiving one or more soft DRX parameters from a network node, the one or more soft DRX parameters comprising information that defines the two or more control channel subsets for the two or more time periods within the DRX awake period, respectively. In some embodiments, receiving the one or more soft DRX parameters from the network node comprises receiving a Radio Resource Control (RRC) message from the network node comprising the one or more soft DRX parameters. In some embodiments, the method further comprises sending capability information to the network node, the capability information comprising an indication of whether the wireless device supports soft DRX. In some embodiments, receiving the one or more soft DRX parameters from the network node comprises receiving a Medium Access Control (MAC) Control Element (CE) from the network node comprising the one or more soft DRX parameters. In some embodiments, the method further comprises deciding to accept soft DRX activation upon receiving the MAC CE, and sending an acceptance of soft DRX activation to the network node.

In some embodiments, the method further comprises sending a message to activate soft DRX to a network node, and receiving a response from the network node. In some embodiments, the message to activate soft DRX comprises one or more soft DRX parameters comprising information that defines the two or more control channel subsets for the two or more time periods within the DRX awake period, respectively. In some embodiments, the message to activate soft DRX comprises one or more modifications to one or more soft DRX parameters comprising information that defines the two or more control channel subsets for the two or more time periods within the DRX awake period, respectively.

In some embodiments, a DRX offset for the wireless device is different than a DRX offset of another wireless device such that at least one of the two or more time periods within the DRX awake period of the wireless device does not overlap with at least one respective time period within a DRX awake period of the other wireless device.

In some embodiments, the method further comprises sending a request to deactivate soft DRX to a network node.

In some embodiments, the method further comprises deactivating soft DRX in response to an occurrence of an external or internal event.

In some embodiments, the method further comprises receiving a request to deactivate soft DRX from a network node.

Embodiments of a wireless device for operation in a wireless communications network are also disclosed. In some embodiments, the wireless device is adapted to monitor, during a DRX awake period, two or more control channel subsets during two or more time periods within the DRX awake period, respectively, wherein the two or more control channel subsets are different subsets of a plurality of candidate control channels. In some embodiments, the wireless device is further adapted to operate according to any embodiment of the method of operation of a wireless device disclosed herein.

In some embodiments, a wireless device for operation in a wireless communications network comprises at least one transceiver, at least one processor, and memory storing instructions executable by the at least one processor whereby the wireless device is operable to monitor, during a DRX awake period, two or more control channel subsets during two or more time periods within the DRX awake period, respectively, wherein the two or more control channel subsets are different subsets of a plurality of candidate control channels. In some embodiments, the wireless device is further adapted to operate according to any embodiment of the method of operation of a wireless device disclosed herein.

In some embodiments, a wireless device for operation in a wireless communications network comprises a monitoring module operable to monitor, during a DRX awake period, two or more control channel subsets during two or more time periods within the DRX awake period, respectively, wherein the two or more control channel subsets are different subsets of a plurality of candidate control channels. In some embodiments, the wireless device further comprises one or more additional modules operable to cause the wireless device to operate according to any embodiment of the method of operation of a wireless device disclosed herein.

Embodiments of a method of operation of a node in a wireless communications network are also disclosed. In some embodiments, the method of operation of the node comprises initiating transmission, during a DRX awake period of a wireless device, of control information to the wireless device in a time period within the DRX awake period of the wireless device on one or more control channels in one of at least two control channel subsets. The at least two control channel subsets are at least two different subsets of a plurality of candidate control channels that are configured for the wireless device for at least two time periods within the DRX awake period of the wireless device, respectively. In some embodiments, the two or more time periods are two or more subframes.

In some embodiments, the plurality of candidate control channels comprise candidate control channels on at least two downlink carriers. In some embodiments, a first control channel subset of the two or more control channel subsets comprise at least one candidate control channel on a first carrier of the at least two downlink carriers but not any candidate control channels on a second carrier of the at least two downlink carriers.

In some embodiments, the plurality of candidate control channels comprises a first plurality of candidate PDCCHs, and a second plurality of candidate ePDCCHs. Further, the two or more control channel subsets comprise a first control channel subset that comprises at least some of the first plurality of candidate PDCCHs but not any of the second plurality of candidate ePDCCHs, and a second control channel subset that comprises at least some of the second plurality of candidate ePDCCHs but not any of the first plurality of candidate PDCCHs.

In some embodiments, at least one of the two or more control channel subsets comprises one or more candidate control channels that utilize a low complexity modulation and coding scheme. In some embodiments, the one or more candidate control channels that utilize a low complexity modulation and coding scheme are candidate control channels that utilize a modulation and coding scheme that is sufficient to carry only data to enable the wireless device to activate a DRX Inactivity Timer or to switch to legacy DRX.

In some embodiments, the two or more control channel subsets consist of two control channel subsets.

In some embodiments, the two or more control channel subsets comprise a first control channel subset that comprises all of the plurality of candidate control channels and a second control channel subset that comprises less than all of the plurality of candidate control channels.

In some embodiments, initiating transmission of control information to the wireless device in the time period within the DRX awake period of the wireless device on one or more control channels in the one of at least two control channel subsets comprises determining a first control channel subset for a first time period within the DRX awake period of the wireless device, initiating transmission of control information to the wireless device in one or more candidate control channels in the first control channel subset during the first time period if the wireless device is scheduled in the first time period, determining a second control channel subset for a second time period within the DRX awake period of the wireless device, and initiating transmission of control information to the wireless device in one or more candidate control channels in the second control channel subset during the second time period if the wireless device is scheduled in the second time period.

In some embodiments, the method further comprises initiating transmission of one or more soft DRX parameters to the wireless device, the one or more soft DRX parameters comprising information that defines the two or more control channel subsets for the two or more time periods within the DRX awake period, respectively. In some embodiments, initiating transmission of the one or more soft DRX parameters to the wireless device comprises initiating transmission of a RRC message to the wireless device comprising the one or more soft DRX parameters. In some embodiments, the method further comprises receiving capability information of the wireless device where the capability information comprises an indication of whether the wireless device supports soft DRX, and deciding whether to activate soft DRX for the wireless device based on the capability information of the wireless device. In some embodiments, initiating transmission of the one or more soft DRX parameters to the wireless device comprises initiating transmission of a MAC CE to the wireless device comprising the one or more soft DRX parameters.

In some embodiments, the method further comprises receiving a message to activate soft DRX from the wireless device, deciding whether to accept activation of soft DRX, and initiating transmission of a response to the wireless device. In some embodiments, the message to activate soft DRX comprises one or more soft DRX parameters comprising information that defines the two or more control channel subsets for the two or more time periods within the DRX awake period, respectively. In some embodiments, the message to activate soft DRX comprises one or more modification to one or more soft DRX parameters comprising information that defines the two or more control channel subsets for the two or more time periods within the DRX awake period, respectively.

In some embodiments, a DRX offset for the wireless device is different than a DRX offset of another wireless device such that at least one of the two or more time periods within the DRX awake period of the wireless device does not overlap with at least one respective time period within a DRX awake period of the other wireless device.

In some embodiments, the method further comprises receiving a request to deactivate soft DRX from the wireless device.

In some embodiments, the method further comprises initiating transmission of a request to deactivate soft DRX to the wireless device.

Embodiments of a node for operation in a wireless communications network are also disclosed. In some embodiments, the node is adapted to initiate transmission, during a DRX awake period of a wireless device, of control information to the wireless device in a time period within the DRX awake period of the wireless device on one or more control channels in one of at least two control channel subsets. The at least two control channel subsets are at least two different subsets of a plurality of candidate control channels that are configured for the wireless device for at least two time periods within the DRX awake period of the wireless device, respectively. In some embodiments, the node is further adapted to operate according to any embodiment of a method of operation of a node disclosed herein.

In some embodiments, a node for operation in a wireless communications network comprises at least one processor and memory storing instructions executable by the at least one processor whereby the node is operable to initiate transmission, during a DRX awake period of a wireless device, of control information to the wireless device in a time period within the DRX awake period of the wireless device on one or more control channels in one of at least two control channel subsets. The at least two control channel subsets are at least two different subsets of a plurality of candidate control channels that are configured for the wireless device for at least two time periods within the DRX awake period of the wireless device, respectively. In some embodiments, the node is further adapted to operate according to any embodiment of a method of operation of a node disclosed herein.

In some embodiments, a node for operation in a wireless communications network comprises a transmission module operable to initiate transmission, during a DRX awake period of a wireless device, of control information to the wireless device in a time period within the DRX awake period of the wireless device on one or more control channels in one of at least two control channel subsets. The at least two control channel subsets are at least two different subsets of a plurality of candidate control channels that are configured for the wireless device for at least two time periods within the DRX awake period of the wireless device, respectively. In some embodiments, the node further comprises one or more additional modules operable to cause the node to operate according to any embodiment of the method of operation of a node disclosed herein.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
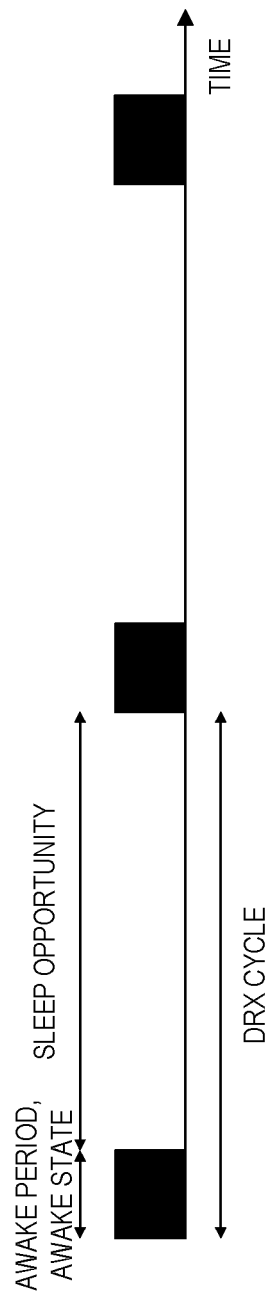
FIG. 1 illustrates an implementation of Discontinuous Reception (DRX) in which a wireless device goes into cycles of predefined Awake/Sleep durations.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node:

As used herein, a "radio node" is either a radio access node or a wireless device.

Radio Access Node:

As used herein, a "radio access node" is any node in a radio access network of a wireless communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node:

As used herein, a "core network node" is any type of node in a core network. Some examples of a core network node include, but are not limited to, e.g., a Mobility Management Entity (MME), a Packet Data Network (PDN) Gateway (P-GW), a Service Capability Exposure Function (SCEF), or the like.

Wireless Device:

As used herein, a "wireless device" is any type of device that has access to (i.e., is served by) a wireless communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node:

As used herein, a "network node" is any node that is either part of the radio access network or the core network of a wireless communications network/system.

Note that the description given herein focuses on a 3GPP wireless communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Legacy Discontinuous Reception (DRX):

A technique where a wireless device can monitor its control channel candidates discontinuously based on pre-defined Awake/Sleep periods.

Soft DRX:

As used herein, "soft DRX" is a DRX technique in which a wireless device monitors, during a DRX awake period, two or more control channel subsets during two or more time periods within the DRX awake period, respectively. The two or more control channel subsets are different subsets of multiple candidate control channels for the wireless device. The candidate control channels is a set of control channels that the wireless device is configured to monitor.

DRX Awake Period:

As used herein, the "DRX awake period" is a period of time during which a wireless device operating according to a DRX scheme is awake during a DRX cycle. In 3GPP LTE, the DRX awake period includes one or more of the following: On Duration Timer for long and short cycle, DRX Inactivity Timer, and DRX Retransmission Timer.

Legacy Wireless Device:

The term "legacy wireless device" as used herein refers to a wireless device (e.g., an LTE UE) that supports legacy DRX.

Enhanced Wireless Device:

The term "enhanced wireless device" or "enhanced UE" as used herein refers to a wireless device (e.g., an LTE UE) that supports soft DRX.

Embodiments of the present disclosure that are presented herein are generally applicable to any wireless network in which the wireless device supports DRX.

Figure 2:
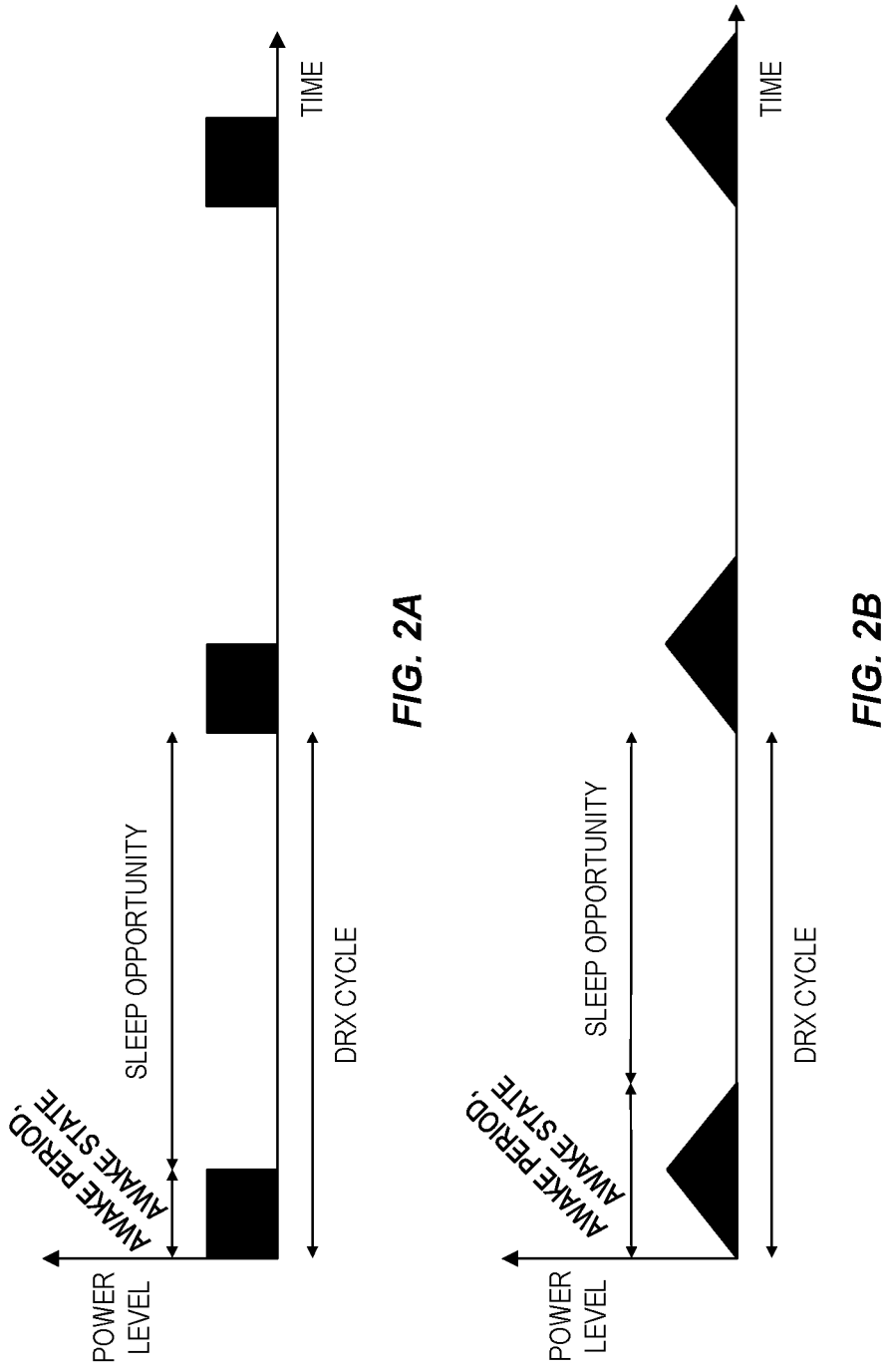
FIGS. 2A and 2B show legacy DRX and an example of soft DRX, respectively.

Embodiments of the present disclosure are related to achieving better tradeoffs between battery saving and latency to, e.g., support ultra-low latency applications by introducing soft DRX. Unlike legacy DRX where power consumption of a wireless device (e.g., an LTE UE) alternates roughly between two discreet power levels corresponding to Awake states and Sleep states, in soft DRX, the power consumption levels of the wireless device can be a set of more than two discreet power levels or ultimately resemble continuous functions. By allowing more power consumption levels, the wireless device can be Awake for longer times with the same total energy consumption achieved by legacy DRX. To illustrate this, FIGS. 2A and 2B show approximation of the power consumed by monitoring control channel candidates for legacy DRX and an example of soft DRX, respectively. The energy consumption due to monitoring control channel candidates of each scheme during the Awake state can be well approximated by the area of the square representing the DRX awake period or Awake state of the legacy DRX and the area of the triangle representing the DRX awake period or Awake state for the soft DRX example. By examining the areas for both schemes, it can be shown that both schemes consume the same amount of energy in this example. However, the DRX awake period or duration of the Awake state for the soft DRX example is twice that of the legacy DRX example. As such, the maximum downlink latency for the soft DRX is reduced as compared to that of the legacy DRX while at the same time energy consumption is not increased (i.e., stays the same in this example). Note that DRX Inactivity Timer, DRX Retransmission Timer, and DRX short cycle are not shown FIGS. 2A and 2B.

In some embodiments, the energy consumption level is varied in different time periods (e.g., subframes) within the DRX awake period (i.e., within the Awake state) by varying the number of candidate control channels that the wireless device monitors during different time periods (e.g., subframes) within the DRX awake period (i.e., during the Awake state). In some embodiments, the energy consumption level is additionally or alternatively varied by restricting the set of control channels to monitor to specific Orthogonal Frequency Division Multiplexing (OFDM) symbols. For instance, a triangle-like power shape such as that illustrated in FIG. 2B can be approximated by gradually monitoring more candidate control channels in every subframe during the DRX awake period until the maximum power is reached, and then gradually monitoring less candidate control channels in every subframe of the DRX awake period until the wireless device goes to sleep. However, this is only one example. Other non-limiting examples are described below.

In some embodiments, a network node (e.g., a base station such as an eNB) varies the soft DRX pattern (e.g., control channel subsets to be monitored during different time periods (e.g., subframes) within the DRX Awake period) of a wireless device. In addition, in some embodiments, a network node (e.g., a base station such as an eNB) controls a wireless device to switch between legacy DRX and soft DRX depending on, e.g., other events such as network load, traffic type, and requests from the wireless device.

While not being limited to or by any particular advantage, embodiments of the present disclosure provide a number of advantages over legacy DRX. For example, soft DRX may be used to reduce downlink latency introduced by legacy DRX without increasing the energy consumption at the wireless device, which makes it attractive for ultra-low latency applications that are expected to be supported in next generation networks such as healthcare and emergency notification systems.

Figure 3:
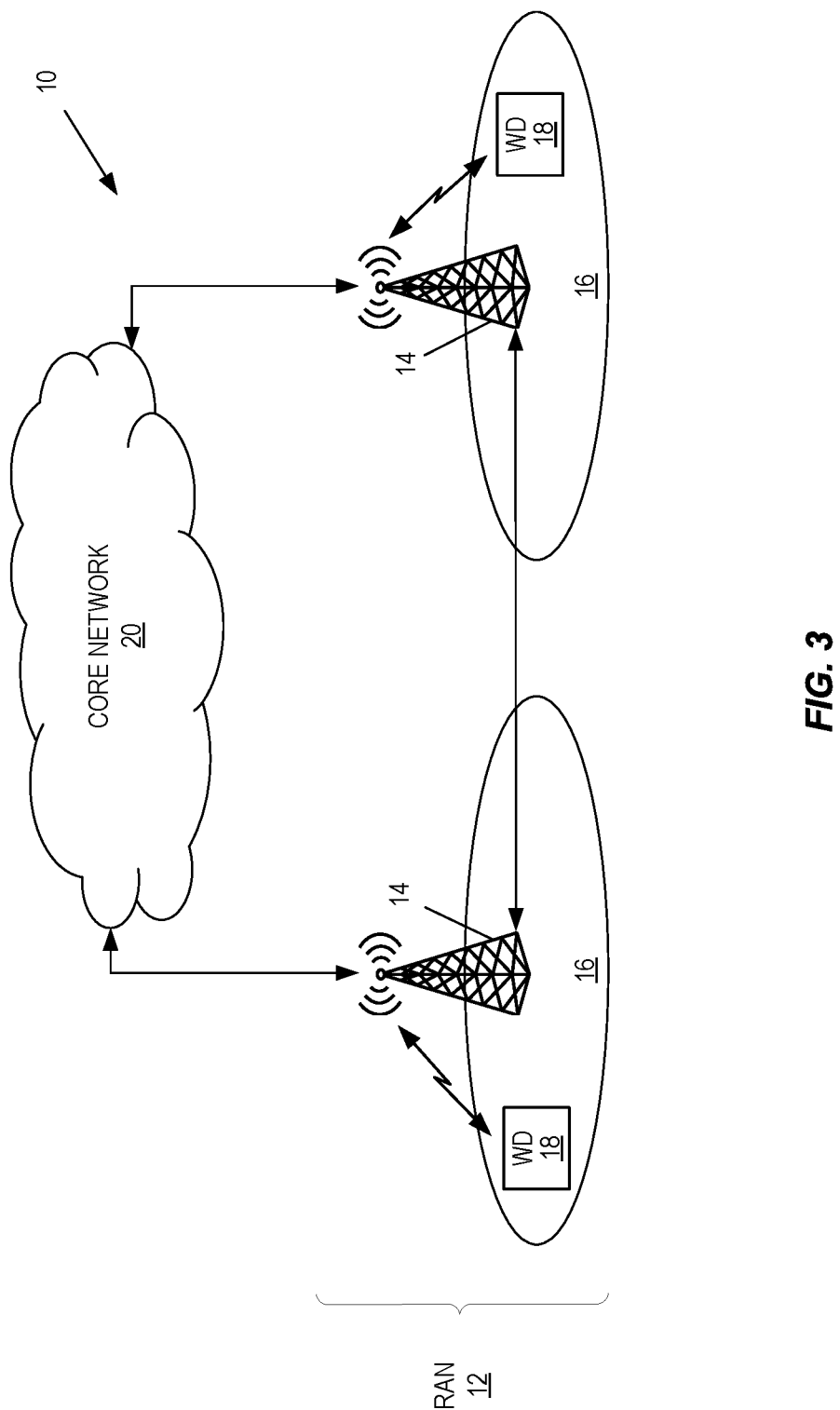
FIG. 3 illustrates one example of a wireless communications network in which embodiments of the present disclosure may be implemented.

A wireless network is considered herein where base stations are used to serve wireless devices. Without loss of generality, the description provided herein focuses on a single cell scenario where a single base station is used to communicate with a single wireless device; however, the present disclosure is not limited thereto. In this regard, FIG. 3 illustrates one example of a wireless communications network 10 in which embodiments of the present disclosure may be implemented. As illustrated, the wireless communications network 10 includes a Radio Access Network (RAN) 12 (e.g., an Evolved Universal Terrestrial RAN (EUTRAN)) including a number of base stations 14 (e.g., LTE eNBs) serving corresponding cells 16. Wireless devices 18 (e.g., LTE UEs) wirelessly transmit and receive signals to and from the base stations 14, as will be appreciated by one of ordinary skill in the art. The base stations 14 may more generally be referred to as radio access nodes. The base stations 14 may be connected to one another via a base-station-to-base-station interface (e.g., an X2 interface) and connected to a core network 20 (e.g., an Evolved Packet Core (EPC)) via respective core network interfaces (e.g., S1 interfaces). The core network 20 includes a number of core network nodes such as, for example, MMEs, P-GWs, Serving Gateways (S-GWs), etc., as will be appreciated by one of ordinary skill in the art.

The base station 14 is assumed to have configured the wireless device(s) 18 that it serves with DRX. In LTE, such configuration is performed by a Radio Resource Control (RRC) message called a RRC reconfiguration message. This RRC message includes a number of DRX parameters that the wireless device 18 needs to use for DRX such as DRX ON duration, long cycle length, DRX Inactivity Timer, DRX Retransmission Timer, short cycle length, short cycle timer, DRX Start offset, etc. The base station 14 and the wireless device 18 will be synchronized in terms of DRX states, i.e., the base station 14 knows precisely when the wireless device 18 is in the Awake state and when the wireless device 18 is in the Sleep state. As mentioned before, a legacy wireless device is required to monitor all control channel candidates that may be assigned to it for every subframe when it is in the Awake state. For instance, in LTE, legacy LTE UEs configured with Physical Downlink Control Channel (PDCCH) are required to monitor 22 PDCCH candidates in every subframe in the Awake state.

Figure 4:
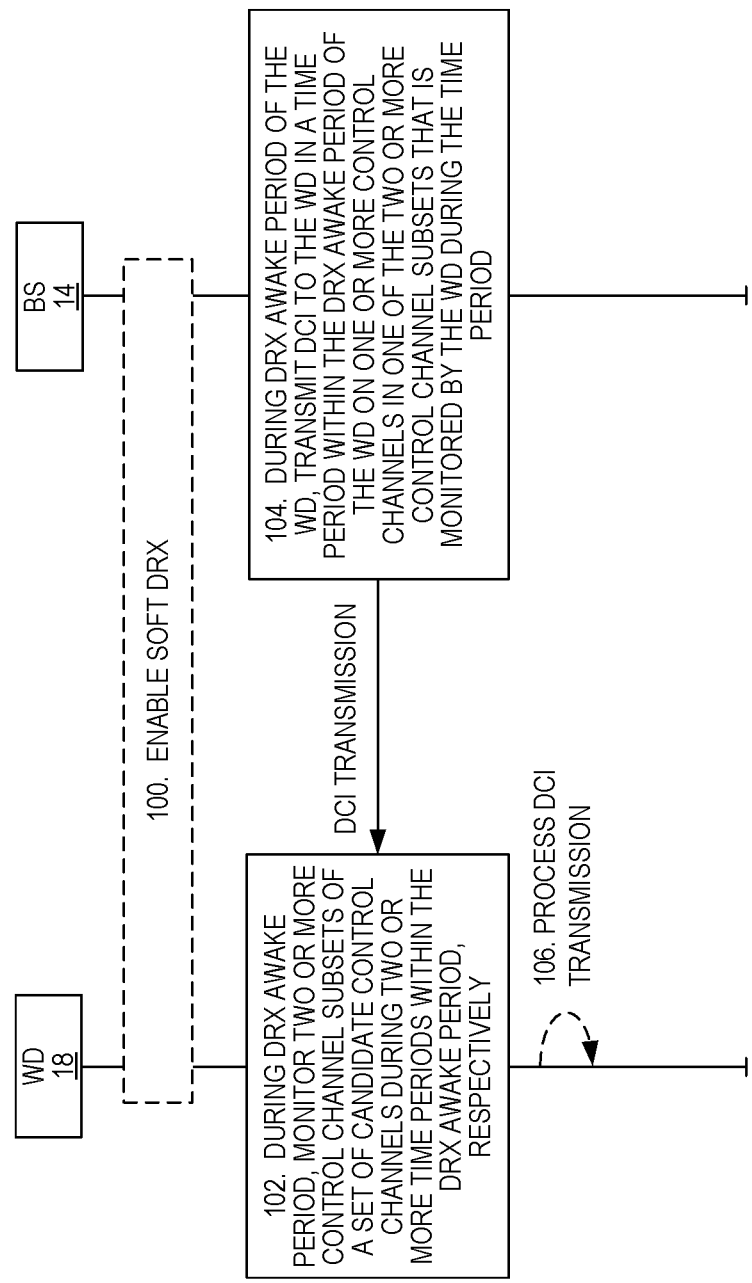
FIG. 4 illustrates the operation of a wireless device and a base station according to some embodiments of the present disclosure.

FIG. 4 illustrates the operation of a wireless device 18 and a base station 14 according to some embodiments of the present disclosure. Note that optional steps are indicated by dashed lines. As illustrated, the base station 14 and the wireless device 18 communicate with one another to enable soft DRX (step 100). In other words, the base station 14 and the wireless device 18 communicate to establish an agreement to use soft DRX. While this can be done using any suitable procedure, soft DRX is enabled via RRC signal in some example embodiments and enabled via Medium Access Control (MAC) signaling in some other example embodiments.

Assuming that soft DRX is enabled, during the DRX awake period, the wireless device 18 monitors two or more control channel subsets during two or more time periods (e.g., two or more subframes) within the DRX awake period, respectively (step 102). In other words, rather than monitoring all candidate control channels for a transmission of Downlink Control Information (DCI) to the wireless device 18 in all time periods (e.g., all subframes) within the DRX awake period as is done by legacy wireless devices, the wireless device 18 monitors different control channel subsets during different time periods (e.g., different subframes) within the DRX awake period. As used herein, a "control channel subset" is a subset of a defined set of candidate control channels that may be assigned to the wireless device 18. More precisely, as used herein, a "control channel subset" is a subset of a defined set of candidate control channels (CC_Candidate_Set) that may be assigned to the wireless device 18, which can be denoted as CC_Subset⊆CC_Candidate_Set, where CC_Subset is the control channel subset and CC_Candidate_Set is the set of candidate control channels. A first control channel subset is "different" than a second control channel subset if any candidate control channel included in the first control channel subset is not also included in the second control channel subset or vice versa. As an example, if the first control channel subset is {CC1, CC2, CC3} and the second control channel subset is {CC1, CC2}, then the two control channel subsets are different even though they have two candidate control channels in common.

Thus, rather than monitoring all candidate control channels for, e.g., a PDCCH transmission intended for the wireless device 18, the wireless device 18 monitors different control channel subsets in different time periods (e.g., subframes) within the DRX awake period. For example, in one time period (e.g., subframe), the wireless device 18 may monitor all of the candidate control channels; and, in another time period (e.g., another subframe), the wireless device 18 may monitor less than all of the candidate control channels, thereby reducing energy consumption.

Unlike legacy DRX where the wireless device's power consumption alternates roughly between two discreet power levels corresponding to Awake states and Sleep states, in soft DRX, the wireless device's power consumption levels can be a set of more than two discreet power levels or ultimately resemble continuous functions. By allowing more power consumption levels, the wireless device can be Awake for longer times with the same total energy consumption achieved by legacy DRX, as illustrated in FIGS. 2A and 2B. As stated previously, the energy consumption for a certain period of time during the Awake state can be measured by the area under power curves during that period of time. In some embodiments, soft DRX is configured to keep the area under the power curve less than or equal to the area of legacy DRX, while extending the time of the Awake state.

Varying the energy consumption levels in different subframes in the Awake state is achieved by varying the number of control channels that the wireless device 18 has to monitor. In particular, the set of control channel candidates can be divided into subsets (possibly overlapping subsets), where monitoring each subset leads to a particular power consumption level. Thus, by designing the subsets and assigning different subsets to different subframes in the Awake state, the power consumption level of the wireless device 18 can be varied over the Awake state. The following are some examples for designing control channel subsets that result in reduced power consumption by the wireless device 18 in the Awake state (i.e., the DRX awake period):

- Some subsets may include less control channel candidates in a narrowband, which reduces the power consumption.
- Some subsets may include control channel candidates that are restricted in time, e.g., restricted to one OFDM symbol period, so the wireless device 18 can sleep early in the subframe.
- For wireless devices 18 that are configured with Carrier Aggregation (CA), i.e., allowed to receive data in more than one carrier, some subsets may include only the control channels in a subset of the carriers that the wireless device 18 should monitor. For example, a wireless device 18 that is configured with two carriers for downlink CA can have two control channel subsets as follows: the first subset includes all control channels in both carriers and the second subset includes the control channels in only the primary carrier. By having some subsets that include only the control channels in a subset of the carriers that the wireless device 18 should monitor, the wireless device 18 can turn off some of the circuitry that is used to monitor the second carrier when it is required to monitor the second subset, thereby reducing power consumption. In 5G, it is envisioned that the wireless device 18 will be configured with a large number of carriers in separate bands; thus, soft DRX may be particularly advantageous in 5G wireless communications networks. As another example, a wireless device 18 that is configured with three carriers for downlink CA can have three control channel subsets as follows: a first subset includes (e.g., all) control channel candidates in the first carrier, the second subset includes (e.g., all) control channel candidates of the second carrier, and a third subset that includes (e.g., all) control channel candidates of the third carrier. As another example, a wireless device 18 that is configured with three carriers for downlink CA can have four control channel subsets as follows: a first subset includes (e.g., all) control channel candidates of all three carriers, the second subset includes (e.g., all) control channel candidates of the first carrier, a third subset that includes (e.g., all) control channel candidates of the second carrier, and a fourth subset that includes (e.g., all) control channel candidates of the third carrier.
- If a wireless device 18 is capable of receiving control information in PDCCH and enhanced PDCCH (ePDCCH) types and the implementation of the wireless device 18 requires different power consumptions for PDCCH as compared to ePDCCH, then one can vary the power consumption by varying the type of control channels in the subsets. For instance, one subset may include some or all of the PDCCH channel candidates (but, e.g., none of the ePDCCH control channel candidates), and another subset may include some or all ePDCCH control channel candidates (but, e.g., none of the PDCCH control channel candidates).
- Some control channels may be designed to have a less sophisticated modulation and encoding scheme (i.e., a low complexity modulation and coding scheme) so it requires less power to decode them. Such control channels may carry less control information. For instance, such control channels may carry a very small amount of control information that is sufficient to allow the wireless device 18 to activate its DRX Inactivity Timer or to move to legacy DRX. A "low complexity" modulation and coding scheme is a modulation and coding scheme that requires less power consumption at the wireless device 18 to perform the demodulation and decoding since it requires less computational steps. For instance, one bit may be sent with repetition coding, which is much easier to decode than several bits encoded with convolutional coding.

Similarly, during the DRX awake period (i.e., the Awake state) of the wireless device 18, the base station 14 transmits DCI to the wireless device 18 in a time period (e.g., subframe) within the DRX awake period of the wireless device 18 on one or more control channels (e.g., one or more PDCCHs) from one of the two or more control channel subsets that is monitored by the wireless device 18 during that time period (step 104). In other words, for a particular time period within the DRX awake period, the wireless device 18 monitors a respective control channel subset. Thus, assuming that the wireless device 18 is to be scheduled during that time period, the base station 14 transmits DCI to the wireless device 18 using one or more of the control channels in the control channel subset being monitored by the wireless device 18 during that time period.

Optionally, the wireless device 18 processes any received DCI, as will be appreciated by one of ordinary skill in the art (step 106). For example, if the DCI indicates downlink resources scheduled for a downlink data transmission to the wireless device 18 in the time period, then the wireless device 18 receives that downlink data transmission in accordance with the DCI.

When enabling, or activating, soft DRX in step 100 of FIG. 4, one or more soft DRX parameters may be configured for the wireless device 18. In some embodiments, in addition to the legacy DRX parameters, the soft DRX parameters may include one or more of the following:

- One or more parameters that indicate the types of Awake periods which soft DRX should be used. For instance, one or more soft DRX parameters may specify whether soft DRX should be used for one or more of the following types of Awake periods: long cycle On Duration Timer, short cycle On Duration Timer, DRX Inactivity Timer, and/or DRX Retransmission Timer. The rest of the parameters below can be applied to all types of Awake periods or they can be specified for each type of Awake period separately. For instance, it may be desired to apply soft DRX only in long cycle On Duration Timer, and use legacy DRX for short cycle On Duration Timer, DRX Inactivity Timer, and DRX Retransmission Timer; in this case, the parameters below will be used only for long cycle On Duration Timer.
- A soft DRX parameter that indicates the number of control channel candidate subsets
  - The number of control channel candidate subsets can be any integer greater than or equal to 1. However, for simplicity, it may be beneficial to restrict the set of possible numbers of control channel candidate subsets; e.g., this set can be {1, 2, 4, 6} and, in this case, two bits are sufficient to indicate the number of control channel candidate subsets.
- One or more soft DRX parameters that, for each control channel subset, indicate:
  - The control channel candidates that belong to the control channel subset.
    - A control channel subset can include any set of the candidate control channels. However, for simplicity, it may be beneficial to restrict the set of possible control channel candidates for each subset in order to reduce the number of bits needed to indicate which control channel candidates belongs to each subset. For example, the control channel candidates can be one of the following four possibilities which requires two bits per subset: {all control channel candidates, first half of control channel candidates, second half of control channel candidates, control channel candidates with even indices}.

The subframes where this control channel subset should be used.

A control channel subset can be indicated to be used for any set of one or more subframes. However, for simplicity, it may be beneficial to restrict the set of possible subframes for each control channel subset in order to reduce the number of bits needed to indicate which subframe(s) belongs to each control channel subset. For example, the subframes can be one of the following four possibilities which require two bits per subset: {first half of subframes in the awake period, second half of subframes in the awake period, first 70% of subframes in the awake period, last 30% of subframes in the awake period}.

An alternative way to simplify the exchange of soft DRX parameters is to define soft DRX profiles which are known a priori to both the base station 14 and the wireless device 18, e.g., stored in a lookup table, where each profile includes different soft DRX parameters. This way, only the index of the soft DRX profile can be exchanged to configure soft DRX.

Figure 5:
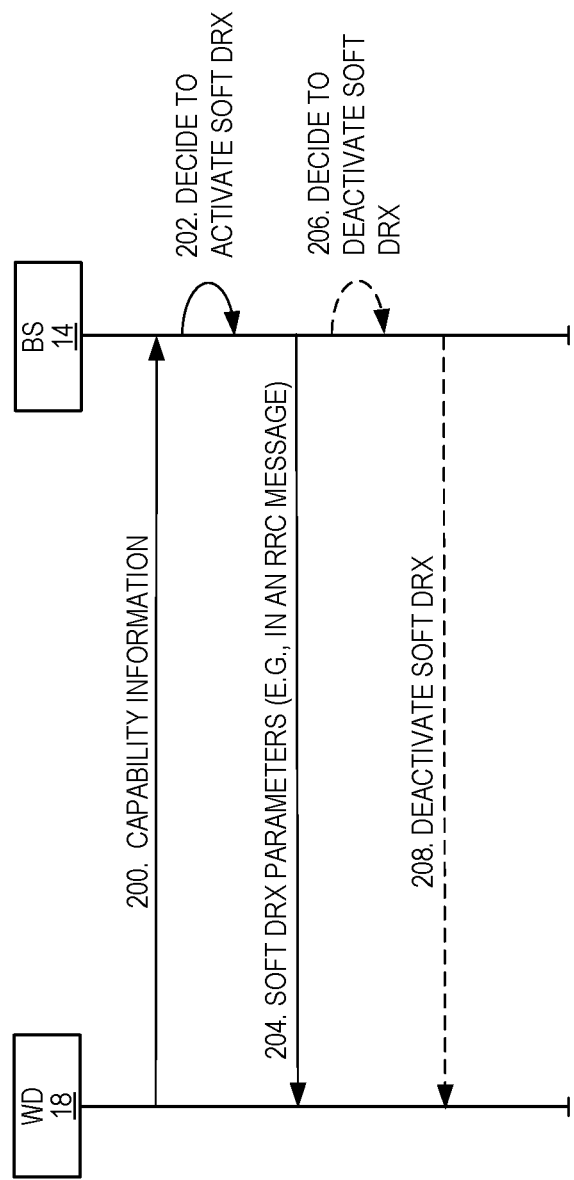
FIG. 5 illustrates one example in which soft DRX is enabled, or activated, via, e.g., Radio Resource Control (RRC) signaling according to some embodiments of the present disclosure.
Figure 6:
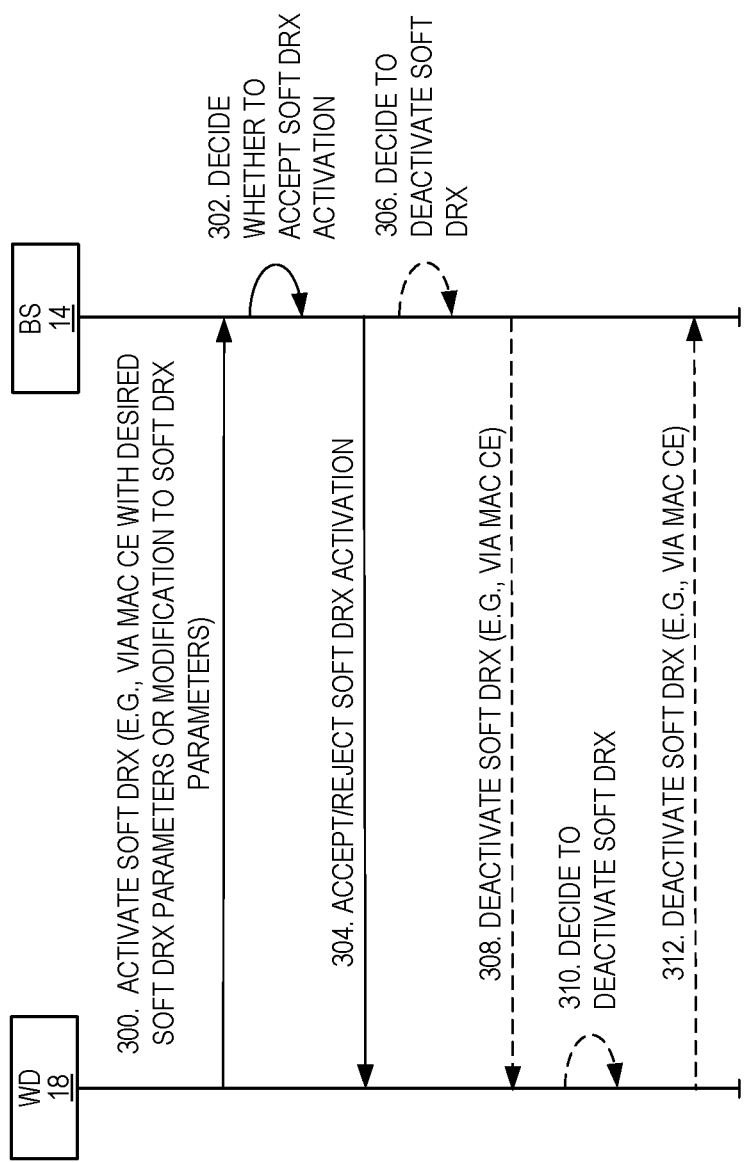
FIG. 6 illustrates one example in which soft DRX is enabled, or activated, via, e.g., Medium Access Control (MAC) signaling according to some embodiments of the present disclosure.
Figure 7:
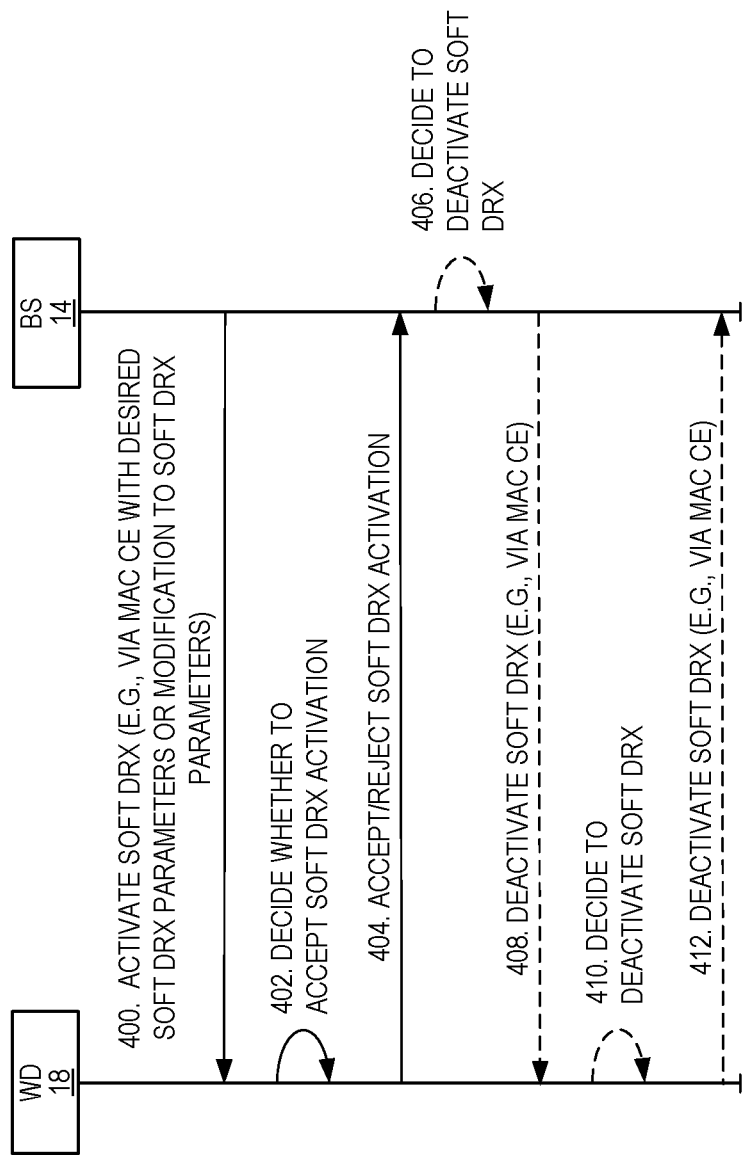
FIG. 7 illustrates another example in which soft DRX is enabled, or activated, via, e.g., MAC signaling according to some embodiments of the present disclosure.

FIGS. 5 through 7 illustrate example embodiments of step 100 of FIG. 4. In particular, FIG. 5 illustrates one example in which soft DRX is enabled, or activated, via, e.g., RRC signaling according to some embodiments of the present disclosure. As illustrated, the wireless device 18 sends capability information to the base station 14 (step 200). This capability information includes an indication as to whether the wireless device 18 supports soft DRX. In some embodiments, the wireless device 18 sends its capability information to the base station 14 during RRC connection establishment. For existing LTE UEs, capability information may be modified to include an indication of whether the LTE UE supports soft DRX.

The base station 14 decides whether to activate soft DRX based on the capability information of the wireless device 18 (step 202). In particular, if both the wireless device 18 and the base station 14 support soft DRX, then the base station 14 decides to activate soft DRX. Otherwise, the base station 14 decides not to activate soft DRX. Assuming that the base station 14 decides to activate soft DRX, the base station 14 sends one or more soft DRX parameters to the wireless device 18, e.g., in an RRC message (step 204). In some embodiments, the base station 14 sends an RRC reconfiguration message to the wireless device 18, where the RRC reconfiguration message indicates to the wireless device 18 that soft DRX is to be activated with one or more soft DRX parameters specified in the RRC reconfiguration message. The one or more soft DRX parameters may include, for example, an indication of the two or more control channel subsets to be monitored by the wireless device 18 and the two or more respective time periods in which the two or more control channel subsets are to be monitored. For example, for each subframe in the DRX awake period, the one or more soft DRX parameters may include an indication of the control channel subset to be monitored by the wireless device 18 in that subframe.

Optionally, at some point after activating soft DRX, the base station 14 may decide to deactivate soft DRX (step 206). This decision may be made based on any suitable criteria such as, for example, the occurrence of particular one or more events, such as change in traffic, number of connected wireless devices, wireless device's battery status, etc. The base station 14 then sends a message to the wireless device 18 instructing the wireless device 18 to deactivate soft DRX (step 208). This message may again be sent via RRC signaling (e.g., an RRC reconfiguration message).

FIG. 6 illustrates one example in which soft DRX is enabled, or activated, via, e.g., MAC signaling according to some embodiments of the present disclosure. As illustrated, the wireless device 18 sends a message to the base station 14 requesting activation of soft DRX (step 300). In some embodiments, this message is provided via a MAC Control Element (CE) that includes one or more desired soft DRX parameters or one or more desired modifications to pre-existing soft DRX parameters. Again, the one or more soft DRX parameters may include, for example, an indication of the two or more control channel subsets to be monitored by the wireless device 18 and the two or more respective time periods in which the two or more control channel subsets are to be monitored.

The base station 14 decides whether to accept soft DRX activation (step 302). This decision may be based on any suitable criteria such as, for example, the capability of the base station 14 to support soft DRX, number of connected wireless devices, and traffic conditions, etc. The base station 14 sends a message either accepting or rejecting soft DRX activation as decided in step 302 (step 304). In some embodiments, the message accepting or rejecting soft DRX activation may be sent via a MAC CE. While not illustrated, the wireless device 18 (and the base station 14) will use soft DRX if activation of soft DRX is accepted or not use soft DRX if activation of soft DRX is rejected.

Optionally, the base station 14 and/or the wireless device 18 may subsequently decide to deactivate soft DRX, in which case appropriate communication is performed to deactivate soft DRX. For example, at some point after activating soft DRX, the base station 14 may decide to deactivate soft DRX (step 306). This decision may be made based on any suitable criteria such as, for example, the occurrence of particular one or more events, such as change in traffic, number of connected wireless devices, wireless device's battery status, etc. The base station 14 then sends a message to the wireless device 18 instructing the wireless device 18 to deactivate soft DRX (step 308). This message may again be sent via a MAC CE. Alternatively, at some point after activating soft DRX, the wireless device 18 may decide to deactivate soft DRX (step 310). This decision may be made based on any suitable criteria such as, for example, the occurrence of particular one or more events, such as change in traffic, number of connected wireless devices, wireless device's battery status, etc. The wireless device 18 then sends a message to the base station 14 requesting deactivation of soft DRX (step 312). This message may again be sent via a MAC CE. Further, the request for deactivation may, in some embodiments, be either accepted or rejected by the base station 14.

FIG. 7 illustrates another example in which soft DRX is enabled, or activated, via, e.g., MAC signaling according to some embodiments of the present disclosure. As illustrated, the base station 14 sends a message to the wireless device 18 requesting activation of soft DRX (step 400). In some embodiments, this message is provided via a MAC CE that includes one or more desired soft DRX parameters or one or more desired modifications to pre-existing soft DRX parameters. Again, the one or more soft DRX parameters may include, for example, an indication of the two or more control channel subsets to be monitored by the wireless device 18 and the two or more respective time periods in which the two or more control channel subsets are to be monitored.

The wireless device 18 decides whether to accept soft DRX activation (step 402). This decision may be based on any suitable criteria such as, for example, the capability of the wireless device 18 to support soft DRX, number of connected wireless devices, and traffic conditions, etc. The wireless device 18 sends a message either accepting or rejecting soft DRX activation as decided in step 402 (step 404). In some embodiments, the message accepting or rejecting soft DRX activation may be sent via a MAC CE. While not illustrated, the base station 14 (and the wireless device 18) will use soft DRX if activation of soft DRX is accepted or not use soft DRX if activation of soft DRX is rejected.

Optionally, the base station 14 and/or the wireless device 18 may subsequently decide to deactivate soft DRX, in which case appropriate communication is performed to deactivate soft DRX. For example, at some point after activating soft DRX, the base station 14 may decide to deactivate soft DRX (step 406). This decision may be made based on any suitable criteria such as, for example, the occurrence of particular one or more events, such as change in traffic, number of connected wireless devices, wireless device's battery status, etc. The base station 14 then sends a message to the wireless device 18 instructing the wireless device 18 to deactivate soft DRX (step 408). This message may again be sent via a MAC CE. Alternatively, at some point after activating soft DRX, the wireless device 18 may decide to deactivate soft DRX (step 410). This decision may be made based on any suitable criteria such as, for example, the occurrence of particular one or more events, such as change in traffic, number of connected wireless devices, wireless device's battery status, etc. The wireless device 18 then sends a message to the base station 14 requesting deactivation of soft DRX (step 412). This message may again be sent via a MAC CE. Further, the request for deactivation may, in some embodiments, be either accepted or rejected by the base station 14.

Figure 8:
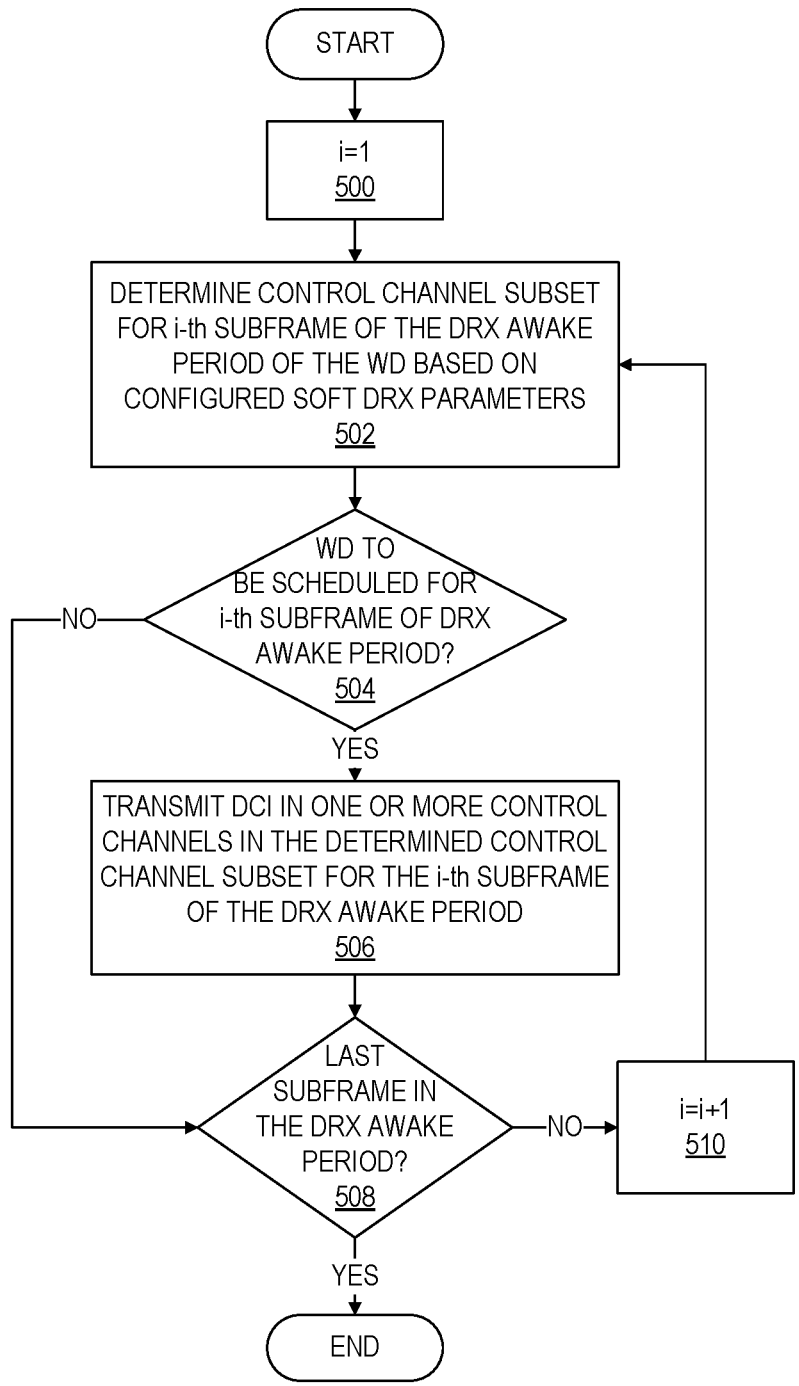
FIG. 8 is a flow chart that illustrates a process performed by a base station according to some embodiments of the present disclosure.

FIG. 8 is a flow chart that illustrates step 104 of FIG. 4 in more detail according to some embodiments of the present disclosure. Note that while the process is described as including a number of "steps," the "steps" may be performed in any order or some of the steps may be performed in parallel unless otherwise indicated or required. As illustrated, the base station 14 initializes a subframe index i to, in this example, 1 (step 500). When the subframe index i is 1, the subframe index i refers to the first subframe in the DRX awake period of the wireless device 18. Likewise, a subframe index i equal to 2 refers to the second subframe in the DRX awake period of the wireless device 18.

The base station 14 determines a control channel subset to be monitored by the wireless device 18 during the i-th subframe of the DRX awake period of the wireless device 18 based on the soft DRX parameters configured for the wireless device 18 (i.e., based on the soft DRX configuration of the wireless device 18) (step 502). In some embodiments, the control channel subset for the i-th subframe of the DRX awake period may be determined based on the soft DRX parameters configured for the wireless device 18, subframe number, and optionally a wireless device (e.g., UE) identifier (e.g., RNTI). The base station 14 also determines whether the wireless device 18 is to be scheduled for the i-th subframe of the DRX awake period of the wireless device 18 (step 504). If not, the process proceeds to step 508. However, if the wireless device 18 is to be scheduled in the i-th subframe of the DRX awake period, the base station 14 transmits DCI in one or more control channels that are in the control channel subset to be monitored by the wireless device 18 for the i-th subframe (step 506). In this manner, the base station 14 limits the control channel(s) on which the DCI is transmitted to the wireless device 18 to those being monitored by the wireless device 18 in the i-th subframe.

Whether proceeding from the NO decision in step 504 or from step 506, the base station 14 determines whether the i-th subframe is the last subframe in the DRX awake period of the wireless device 18 (step 508). If so, the process ends. Otherwise, the base station 14 increments the subframe index i (step 510), and the process returns to step 502 and is repeated for the next subframe. Using the process of FIG. 8, the base station 14 operates to, in each subframe in which the wireless device 18 is awake, determine the control channel subset to be monitored by the wireless device 18 in that subframe and, if appropriate, transmit DCI to the wireless device 18 in that subframe on one or more of the control channels in the control channel subset being monitored by the wireless device 18.

Figure 9:
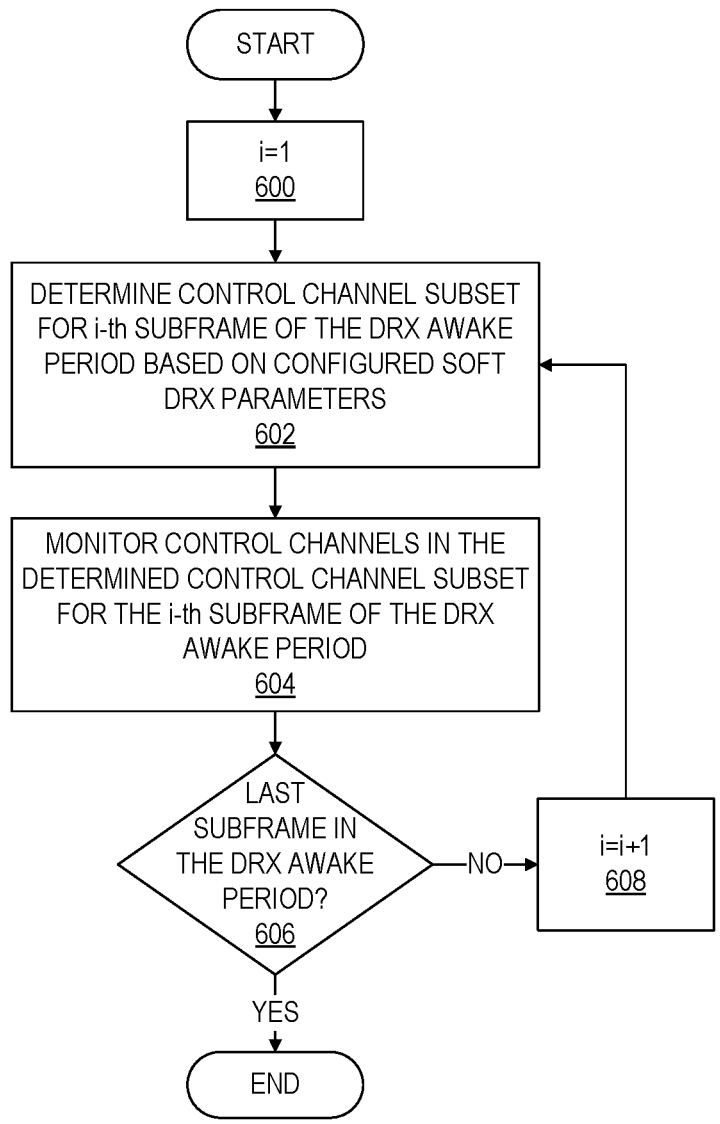
FIG. 9 is a flow chart that illustrates a process performed by a wireless device according to some embodiments of the present disclosure.

FIG. 9 is a flow chart that illustrates step 102 of FIG. 4 in more detail according to some embodiments of the present disclosure. Note that while the process is described as including a number of "steps," the "steps" may be performed in any order or some of the steps may be performed in parallel unless otherwise indicated or required. As illustrated, the wireless device 18 initializes a subframe index i to, in this example, 1 (step 600). When the subframe index i is 1, the subframe index i refers to the first subframe in the DRX awake period of the wireless device 18. Likewise, a subframe index i equal to 2 refers to the second subframe in the DRX awake period of the wireless device 18.

The wireless device 18 determines a control channel subset to be monitored by the wireless device 18 during the i-th subframe of the DRX awake period of the wireless device 18 based on the soft DRX parameters configured for the wireless device 18 (i.e., based on the soft DRX configuration of the wireless device 18), subframe number, and optionally based on a wireless device (e.g., UE) identifier such as an RNTI (step 602). In some embodiments, the control channel subset to be monitored by the wireless device 18 during the i-th subframe of the DRX awake period may be determined based on the soft DRX parameters configured for the wireless device 18, subframe number, and optionally a wireless device (e.g., UE) identifier (e.g., RNTI). The wireless device 18 then monitors the candidate control channels in the determined control channel subset for the i-th subframe of the DRX awake period (step 604). In some embodiments, this monitoring is or at least includes blind decoding over all of the candidate control channels in the control channel subset determined for the i-th subframe. In this manner, rather than monitoring all possible candidate control channels in all subframes, the wireless device 18 monitors only those candidate control channels in the control channel subset configured for the particular subframe.

The wireless device 18 determines whether the i-th subframe is the last subframe in the DRX awake period of the wireless device 18 (step 606). If so, the process ends. Otherwise, the wireless device 18 increments the subframe index i (step 608), and the process returns to step 602 and is repeated for the next subframe. Using the process of FIG. 9, the wireless device 18 operates to, in each subframe in which the wireless device 18 is awake, determine the control channel subset to be monitored by the wireless device 18 in that subframe and monitor only those candidate control channels in the determined control channel subset.

A simple and practical embodiment of soft DRX can be constructed by dividing the set of candidate control channels that the wireless device 18 is supposed to monitor into two control channel subsets. Each of these two control channel subsets is assigned to a respective subset of the subframes in the DRX awake period of the wireless device 18. One specific example of this embodiment is described below with respect to FIG. 10 and FIGS. 11A and 11B. To facilitate the discussion, followings symbols are defined:

| Symbol | Definition |
| --- | --- |
| $P_1$ | the power required by the wireless device to monitor the first control channel subset using soft DRX |
| $P_2$ | the power required by the wireless device to monitor the second control channel subset using soft DRX |
| $P_{legacy}$ | the power required by the wireless device to monitor all control channel candidates using legacy DRX |
| $n_1$ | Number of subframes where the wireless device is Awake and it is expected to monitor the first control channel subset using soft DRX |
| $n_2$ | Number of subframes where the wireless device is Awake and it is expected to monitor the second control channel subset using soft DRX |
| $n_{legacy}$ | Number of subframes where the wireless device is Awake and it is expected to monitor all control channel candidates using legacy DRX |

One can design soft DRX to insure that it results in the same or less energy while making the wireless device 18 stay awake for longer or similar duration as compared to legacy DRX by satisfying the following equations:

$n_1 P_1 + n_2 P_2 \leq n_{legacy} P_{legacy}$, (Energy constraint)

$n_1 + n_2 \geq n_{legacy}$, (Awake period constraint)

Example 1

Assume the first and second control channel subsets are chosen such that the first control channel subset is the same as legacy DRX while the second control channel subset requires only 50% of the power to be monitored, i.e., $P_1 = P_{legacy}$ and $P_2 = 0.5\ P_{legacy}$. The first control channel subset provides the base station 14 the same flexibility in scheduling the wireless device 18 as compared to legacy DRX, as the wireless device 18 is expected to decode all control channel candidates. However, the second control channel subset provides the base station 14 with less flexibility as the wireless device 18 is expected to monitor fewer candidate control channels. Further, assume the Awake period of the legacy DRX is ten subframes.

Figure 10:
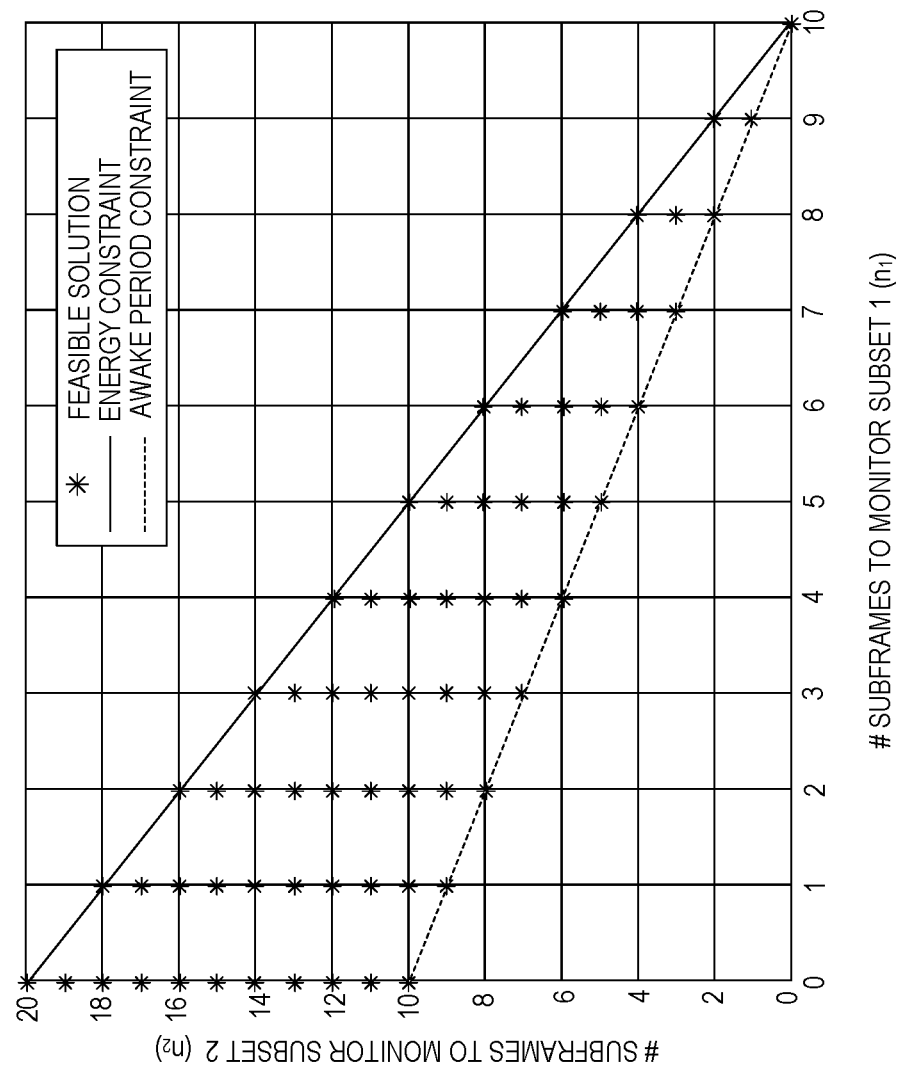
FIG. 10 illustrates a plot of all feasible values of $n_1$. (the number of subframes where the wireless device is Awake and it is expected to monitor a first control channel subset using soft DRX) and $n_2$ (number of subframes where the wireless device is Awake and it is expected to monitor the second control channel subset using soft DRX) that satisfy two constraints according to some example embodiments of the present disclosure.

In FIG. 10, all feasible values of $n_1$ and $n_2$ that satisfy the two constraints above are plotted. The constraint lines are also shown in FIG. 10. Higher values of $n_2$ result in more battery saving and less latency, but lower scheduling flexibility. On the other hand, higher values of $n_1$ result in less battery saving and more latency, but higher scheduling flexibility. Hence, in choosing $n_1$ and $n_2$, it is important to have good tradeoff between battery saving, latency, and scheduling flexibility.

Figure 11A:
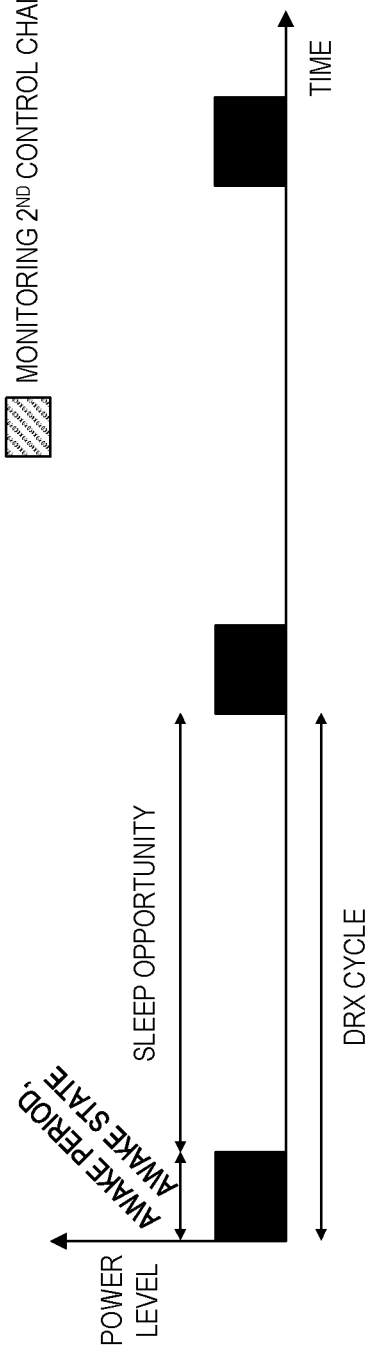
FIGS. 11A and 11B provide an illustration of the soft DRX profile compared to legacy DRX profile for an example in which $n_1=5$ and $n_2=10$.
Figure 11B:
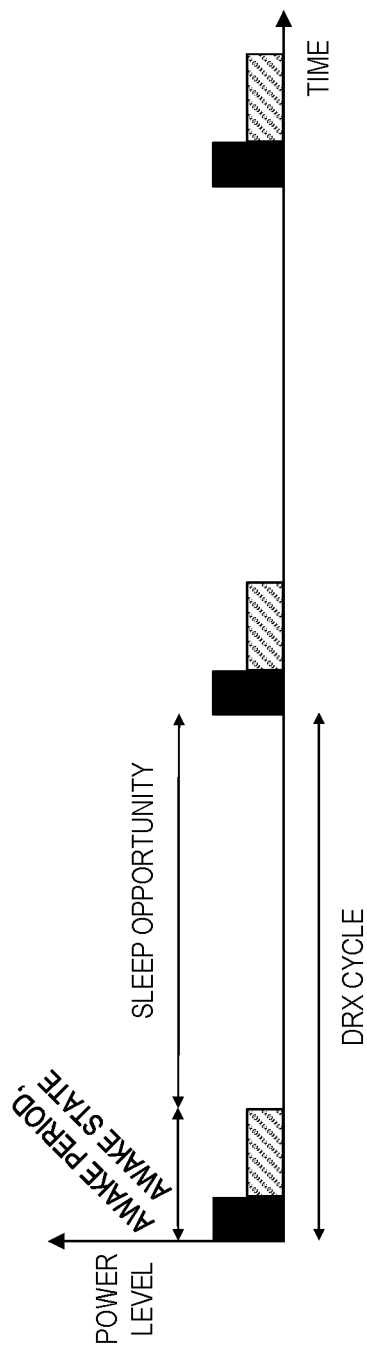

One example solution is to have $n_1=5$ and $n_2=10$, which results in the same energy consumption of legacy DRX but with a total awake period of 15 subframes, i.e., 50% more than legacy DRX. The gain comes at the expense that the base station 14 will have the same flexibility of scheduling the wireless device 18 as compared to legacy DRX for only five subframes instead of ten subframes. An illustration of the soft DRX profile compared to the legacy DRX profile for $n_1=5$ and $n_2=10$ is shown in FIGS. 11A and 11B.

The embodiment described above for two control channel subsets can be generalized by dividing the set of candidate control channels that the wireless device 18 is supposed to monitor into K subsets, and assigning each control channel subset to a respective subset of the subframes in the DRX awake period of the wireless device 18. To facilitate the discussion, the following symbols are defined:

| Symbol | Definition |
| --- | --- |
| $P_k$ | the power required by the wireless device to monitor the $k^{th}$ control channel subset using soft DRX |
| $n_k$ | Number of subframes where the wireless device is Awake and it is expected to monitor the $k^{th}$ control channel subset using soft DRX |

One can design soft DRX to ensure that it results in the same or less energy while making the wireless device 18 stay awake for longer or similar duration compared to legacy DRX by satisfying the following equations:

$\Sigma_{k=1}^{K} n_k P_k \leq n_{legacy} P_{legacy}$, (Energy constraint)

$\Sigma_{k=1}^{K} n_k \geq n_{legacy}$, (Awake period constraint)

As noted above, by reducing the number of control channel candidates monitored by the wireless device 18 in a particular subframe, the base station 14 will have less flexibility in scheduling the wireless device 18 in that subframe. For instance, if two wireless devices 18 monitor only the same, single candidate, then these two wireless devices 18 cannot be scheduled at the same time in a subframe. Thus, it is expected that using soft DRX may lead to reduced scheduling flexibility at the base station 14 compared to legacy DRX, as soft DRX limits the number of control channels monitored by the wireless device 18 in some subframes.

In some embodiments, one or more techniques are applied to improve the scheduling flexibility of the base station 14 when soft DRX is used. In particular, in some embodiments, different wireless devices 18 or different groups of wireless devices 18 may be configured with different DRX offsets such that a subframe(s) to which a control channel subset having a limited number of candidate control channels is assigned for one wireless device 18 (or one group of wireless devices 18) does not overlap with a subframe(s) to which the same control channel subset is assigned to another wireless device 18 (or another group of wireless devices 18). In this manner, scheduling flexibility is improved.

Figure 12A:
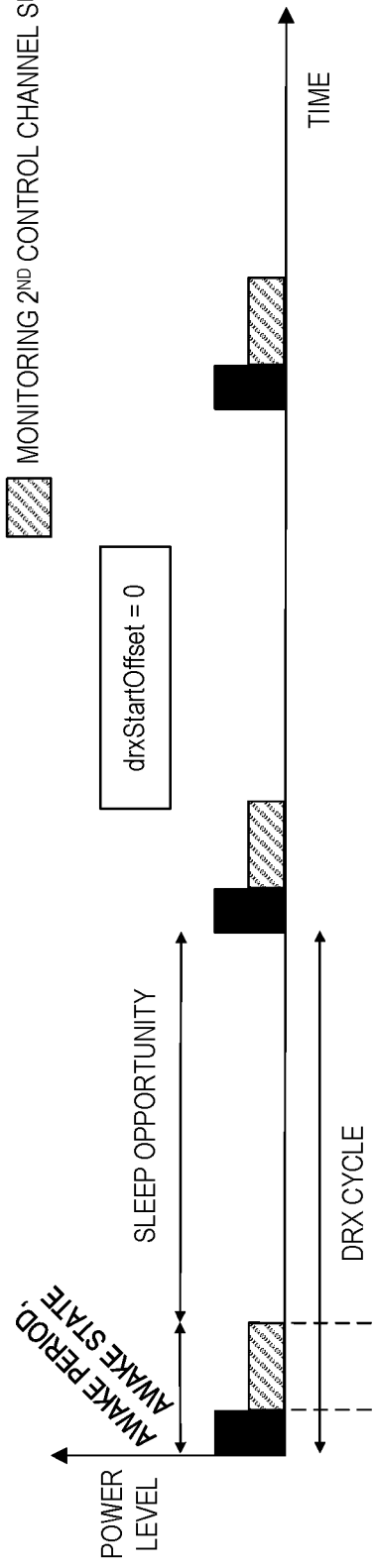
FIGS. 12A and 12B show the soft DRX profiles of two wireless devices, assuming that both wireless devices use the soft DRX profile shown in FIG. 11B.
Figure 12B:
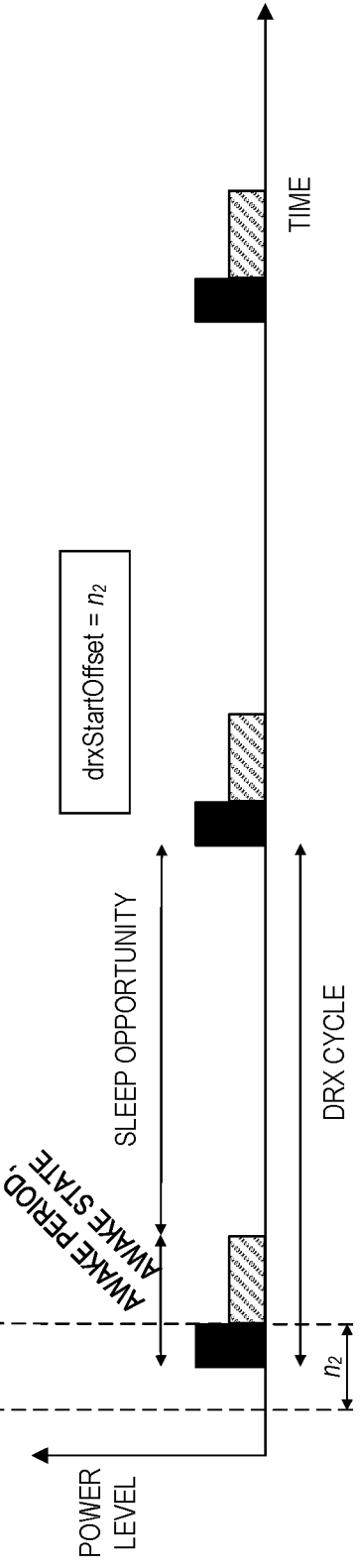

More specifically, the limit in scheduling flexibility is mainly observed in the event when there is more than one wireless device 18 that monitor limited and similar control channel subsets at the same time. To reduce the probability of such an event, the base station 14 can properly assign different DRX offsets (drxStartOffset) for different wireless devices 18, where drxStartOffset is defined as the starting time with respect to subframe number when the wireless device 18 activates the On Duration Timer. To illustrate this, FIGS. 12A and 12B show the soft DRX profiles of two wireless devices 18, assuming that both wireless devices 18 use the soft DRX profile provided in Example 1 and shown in FIG. 11B. It can be seen from FIGS. 12A and 12B that the second control subset of the two wireless devices 18 do not overlap by properly adjusting the drxStartOffset. In this manner, scheduling flexibility is improved.

In some embodiments, another technique that may be used to improve scheduling flexibility when using soft DRX is as follows. Whenever there is initial uplink or downlink transmission, the Awake state is extended by starting or re-starting a DRX Inactivity Timer. The rationale behind starting the DRX Inactivity Timer is that the wireless device 18 is likely to have more uplink/downlink data. During the DRX Inactivity Timer, it is advantageous from a scheduling flexibility point of view to monitor all control channel candidates (i.e., similar to legacy DRX) for most (if not all) of the DRX Inactivity Timer as it is likely that the wireless device 18 will have more uplink/downlink data. Thus, in some embodiments, even when soft DRX is active, the wireless device 18 monitors all candidate control channels during the DRX Inactivity Timer. This enables the base station 14 to transmit DCI to the wireless device 18 on any of the candidate control channels during the DRX Inactivity Timer.

In some embodiments, another technique that may be used to improve scheduling flexibility when using soft DRX is as follows. Since the set of all control channel candidates can be determined by a wireless device's identifier (e.g., using an RNTI in LTE), the base station 14 can properly assign different wireless device identifiers for those wireless devices 18 with soft DRX such that the overlap is minimized for all control channel candidates or at least for the control channel subset having a limited number of candidate control channels.

Modifying the DRX parameters for legacy DRX is supported in the LTE standard. This can be done by sending an RRC Reconfiguration message with a new DRX configuration. Modifying the DRX parameters for legacy DRX using MAC CEs is also possible. As discussed above, in some embodiments, switching between legacy DRX and soft DRX, e.g., due to particular events, may be performed using, e.g., either RRC signaling or MAC CEs. For instance, if the base station 14 is overloaded with many wireless devices 18, the base station 14 may request some or all of the wireless devices 18 to switch to legacy DRX in order to have full scheduling flexibility. In another instance, the base station 14 may request the wireless device 18 to change its soft DRX parameters, such as the number of control channel subsets. Similarly, the wireless device 18 may request a change to its soft DRX parameters due to any event, such as running low on battery power.

Figure 13:
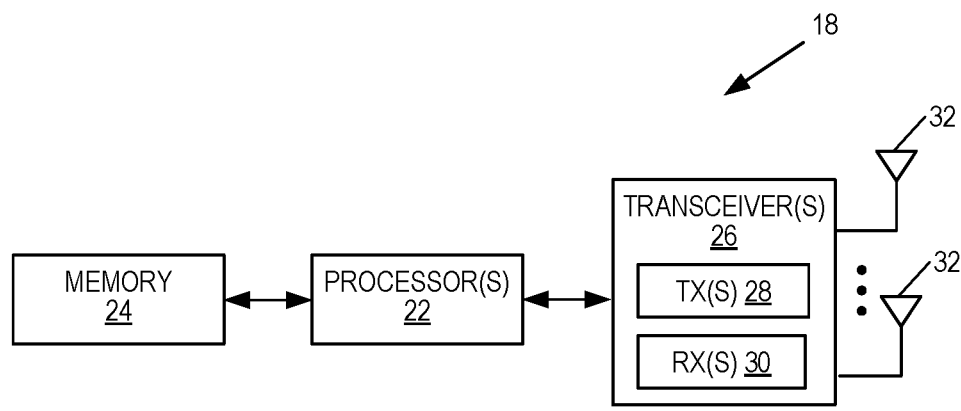
FIGS. 13 and 14 are block diagrams of example embodiments of a wireless device.

FIG. 13 is a schematic block diagram of the wireless device 18 according to some embodiments of the present disclosure. As illustrated, the wireless device 18 includes one or more processors 22 (e.g., Central Processing Units (CPUs), Application Specific Integrated Circuits (ASICs), Field Programmable Gate Arrays (FPGAs), and/or the like), memory 24, and one or more transceivers 26 each including one or more transmitters 28 and one or more receivers 30 coupled to one or more antennas 32. In some embodiments, the functionality of the wireless device 18 described herein may be fully or partially implemented in software that is, e.g., stored in the memory 24 and executed by the processor(s) 22.

In some embodiments, a computer program including instructions which, when executed by at least one processor, causes the at least one processor to carry out the functionality of the wireless device 18 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
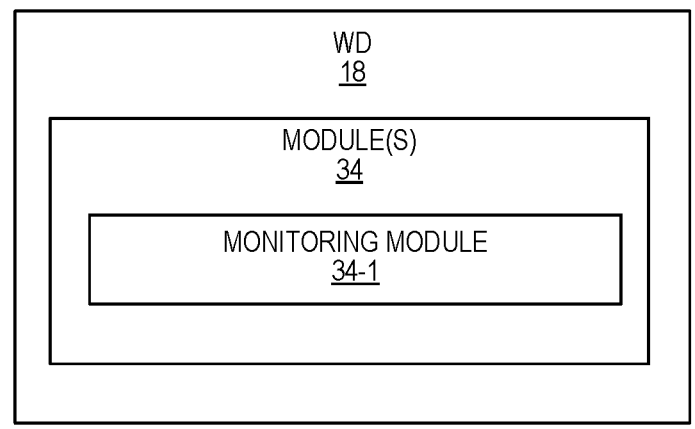

FIG. 14 is a schematic block diagram of the wireless device 18 according to some other embodiments of the present disclosure. The wireless device 18 includes one or more modules 34, each of which is implemented in hardware, software, or combinations of both. As an example, in some embodiments, the one or more modules 34 include one or more modules that operate to perform the functionality of the wireless device 18 with respect to the process described above. For example, the modules 34 may include a monitoring module 34-1 that operates to monitor, during a DRX awake period, two or more control channel subsets during two or more time periods within the DRX awake period, respectively, wherein the two or more control channel subsets are different subsets of a plurality of candidate control channels, as described above. The modules 34 may include additional modules that perform the additional functionality of the wireless device 18 described above.

Figure 15:
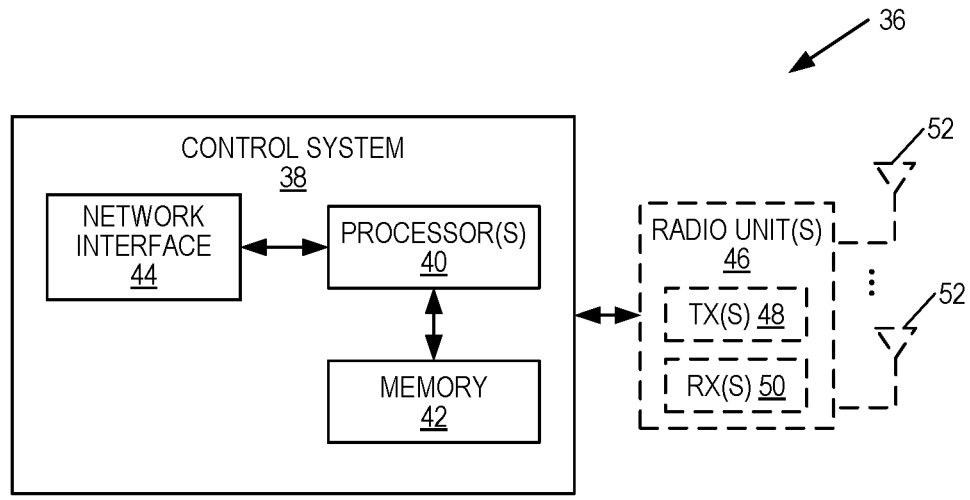
FIGS. 15 to 17 are block diagrams of example embodiments of a network node.

FIG. 15 is a schematic block diagram of a network node 36 according to some embodiments of the present disclosure. The network node 36 may be, for example, a radio access node such as, for example, a base station 14 or a core network node such as, for example, a node in the core network 20 of FIG. 3. As illustrated, the network node 36 includes a control system 38 that includes one or more processors 40 (e.g., CPUs, ASICs, FPGAs, and/or the like), memory 42, and a network interface 44. In addition, if the network node 36 is a radio access node, then the network node 36 also includes one or more radio units 46 that each includes one or more transmitters 48 and one or more receivers 50 coupled to one or more antennas 52. In some embodiments, the radio unit(s) 46 is external to the control system 38 and connected to the control system 38 via, e.g., a wired connection (e.g., an optical cable). However, in some other embodiments, the radio unit(s) 46 and potentially the antenna(s) 52 are integrated together with the control system 38. The one or more processors 40 operate to provide one or more functions of a network node as described herein. In some embodiments, the function(s) are implemented in software that is stored, e.g., in the memory 42 and executed by the one or more processors 40.

Figure 16:
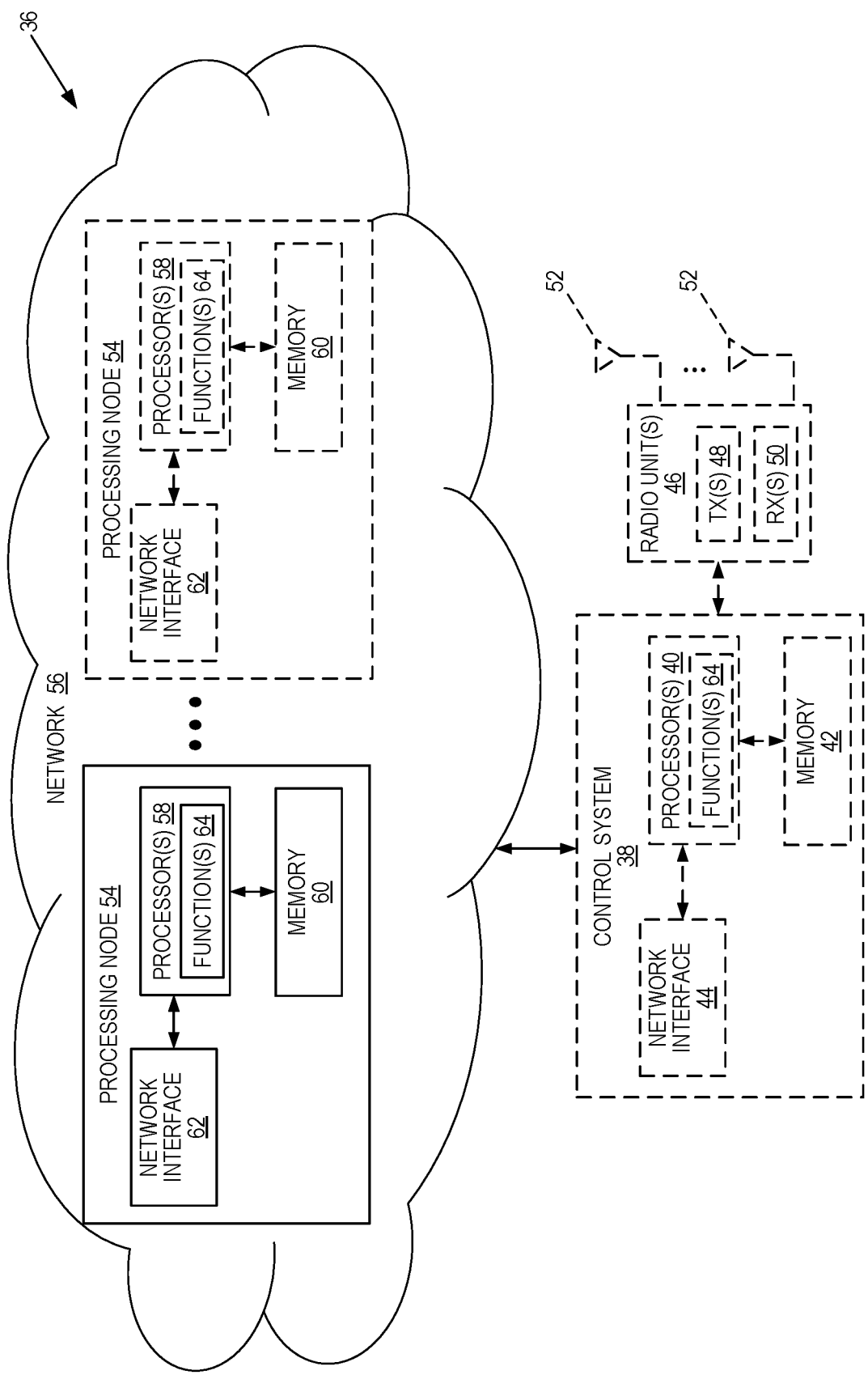

FIG. 16 is a schematic block diagram that illustrates a virtualized embodiment of the network node 36 according to some embodiments of the present disclosure. As used herein, a "virtualized" network node (e.g., a virtualized base station or a virtualized radio access node) is an implementation of the network node in which at least a portion of the functionality of the network is implemented as a virtual component (e.g., via a virtual machine(s) executing on a physical processing node(s) in a network(s)). As illustrated, in this example, the network node 36 may include the control system 38 that includes the one or more processors 40 (e.g., CPUs, ASICs, FPGAs, and/or the like), the memory 42, and the network interface 44 and, depending on the type of network node, the one or more radio units 46 that each includes the one or more transmitters 48 and the one or more receivers 50 coupled to the one or more antennas 52, as described above. The control system 38 is connected to the radio unit(s) 46 via, for example, an optical cable or the like. The control system 38 is connected to one or more processing nodes 54 coupled to or included as part of a network(s) 56 via the network interface 44. Each processing node 54 includes one or more processors 58 (e.g., CPUs, ASICs, FPGAs, and/or the like), memory 60, and a network interface 62.

In this example, functions 64 of the network node 36 (e.g., functions of the base station 14) described herein are implemented at the one or more processing nodes 54 or distributed across the control system 38 and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 is used in order to carry out at least some of the desired functions 64. Notably, in some embodiments, the control system 38 may not be included, in which case the radio unit(s) 46 communicate directly with the processing node(s) 54 via an appropriate network interface(s). Further, in embodiments in which the network node 36 is not a radio access node (e.g., a core network node), then the network node 36 may be entirely virtualized (i.e., there may be no control system 38 or radio unit(s) 46.

In some embodiments, a computer program including instructions which, when executed by at least one processor, causes the at least one processor to carry out the functionality of a network node or a node (e.g., a processing node 54) implementing one or more of the functions 64 of the network node in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
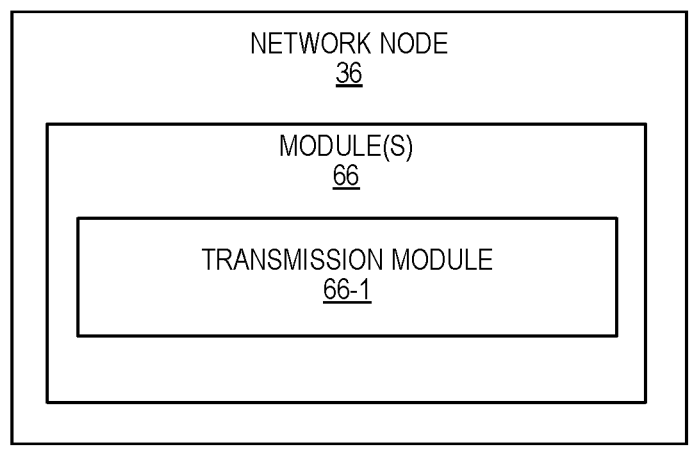

FIG. 17 is a schematic block diagram of the network node 36 according to some other embodiments of the present disclosure. The network node 36 includes one or more modules 66, each of which is implemented in hardware, software, or combinations of both. The module(s) 66 provide the functionality of the network node 36 described herein. For example, the module(s) 66 may include one or modules that perform the operations of the base station 14 described above. In particular, the module(s) 66 may include a transmission module 66-1 operable to initiate transmission, during a DRX awake period of a wireless device 18, of DCI to the wireless device 18 in a time period within the DRX awake period of the wireless device 18 on one or more control channels in one of at least two control channel subsets, wherein the at least two control channel subsets are at least two different subsets of a plurality of candidate control channels that are configured for the wireless device 18 for at least two time periods within the DRX awake period of the wireless device (18), respectively.

The following acronyms are used throughout this disclosure.

μs Microsecond
3GPP Third Generation Partnership Project
5G Fifth Generation
ASIC Application Specific Integrated Circuit
CA Carrier Aggregation
CE Control Element
CPU Central Processing Unit
DCI Downlink Control Information
DRX Discontinuous Reception
eNB Enhanced or Evolved Node B
EPC Evolved Packet Core
ePDCCH Enhanced Physical Downlink Control Channel
EUTRAN Evolved Universal Terrestrial Radio Access Network
FPGA Field Programmable Gate Array
kHz Kilohertz
LTE Long Term Evolution
MAC Medium Access Control
MME Mobility Management Entity
ms Millisecond
MTC Machine Type Communication
OFDM Orthogonal Frequency Division Multiplexing
PDCCH Physical Downlink Control Channel
PDN Packet Data Network
PDSCH Physical Downlink Shared Channel
P-GW Packet Data Network Gateway
PRB Physical Resource Block
RAN Radio Access Network
RE Resource Element
RNTI Radio Network Temporary Identifier
RRC Radio Resource Control
SCEF Service Capability Exposure Function
S-GW Serving Gateway
TR Technical Report
TS Technical Specification
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a wireless communications network, the method comprising:
    monitoring, during a Discontinuous Reception (DRX) awake period, two or more control channel subsets of a plurality of candidate control channels during two or more time periods within the DRX awake period, respectively, the two or more control channel subsets being assigned for a downlink control channel transmission to the wireless device, wherein the two or more control channel subsets are different subsets of the plurality of candidate control channels, and wherein the plurality of candidate control channels is a set of control channels that the wireless device is operable to monitor to receive downlink control information (DCI) from a base station.

2. The method of claim 1, wherein the two or more time periods are two or more subframes.

3. The method of claim 1, wherein:
    the plurality of candidate control channels comprises a first plurality of candidate Physical Downlink Control Channels (PDCCHs) and a second plurality of candidate enhanced PDCCHs (ePDCCHs); and
    the two or more control channel subsets comprise:
        a first control channel subset that comprises at least some of the first plurality of candidate PDCCHs and not any of the second plurality of candidate ePDCCHs; and
        a second control channel subset that comprises at least some of the second plurality of candidate ePDCCHs and not any of the first plurality of candidate PDCCHs.

4. The method of claim 1, wherein the two or more control channel subsets consist of two control channel subsets.

5. The method of claim 1, wherein the two or more control channel subsets comprise a first control channel subset that comprises all of the plurality of candidate control channels and a second control channel subset that comprises less than all of the plurality of candidate control channels.

6. The method of claim 1, wherein monitoring the two or more control channel subsets of the plurality of candidate control channels during the two or more time periods within the DRX awake period, respectively, comprises:

determining a first control channel subset for a first time period within the DRX awake period;

monitoring only those candidate control channels in the first control channel subset that are configured for the first time period for the downlink control channel transmission to the wireless device;

determining a second control channel subset for a second time period within the DRX awake period; and monitoring only those candidate control channels in the second control channel subset that are configured for the second time period for the downlink control channel transmission to the wireless device.

7. The method of claim 1, further comprising:

receiving one or more soft DRX parameters from the base station, the one or more soft DRX parameters comprising information that defines the two or more control channel subsets for the two or more time periods within the DRX awake period, respectively.

8. A wireless device for operation in a wireless communications network, the wireless device comprising:

at least one transceiver;

at least one processor; and memory storing instructions executable by the at least one processor whereby the wireless device is operable to:

monitor, during a Discontinuous Reception (DRX) awake period, two or more control channel subsets of a plurality of candidate control channels during two or more time periods within the DRX awake period, respectively, the two or more control channel subsets being assigned for a downlink control channel transmission to the wireless device, wherein the two or more control channel subsets are different subsets of the plurality of candidate control channels, and wherein the plurality of candidate control channels is a set of control channels that the wireless device is operable to monitor to receive downlink control information (DCI) from a base station.

9. The wireless device of claim 8, wherein the two or more time periods are two or more subframes.

10. The wireless device of claim 8, wherein:

the plurality of candidate control channels comprises a first plurality of candidate Physical Downlink Control Channels (PDCCHs) and a second plurality of candidate enhanced PDCCHs (ePDCCHs); and the two or more control channel subsets comprise:

a first control channel subset that comprises at least some of the first plurality of candidate PDCCHs and not any of the second plurality of candidate ePDCCHs; and a second control channel subset that comprises at least some of the second plurality of candidate ePDCCHs and not any of the first plurality of candidate PDCCHs.

11. The wireless device of claim 8, wherein the two or more control channel subsets consist of two control channel subsets.

12. The wireless device of claim 8, wherein the two or more control channel subsets comprise a first control channel subset that comprises all of the plurality of candidate control channels and a second control channel subset that comprises less than all of the plurality of candidate control channels.

13. The wireless device of claim 8, wherein when monitoring the two or more control channel subsets of the plurality of candidate control channels during the two or more time periods within the DRX awake period, respectively, the wireless device is further operable to:

determine a first control channel subset for a first time period within the DRX awake period;

monitor only those candidate control channels in the first control channel subset that are configured for the first time period for the downlink control channel transmission to the wireless device;

determine a second control channel subset for a second time period within the DRX awake period; and monitor only those candidate control channels in the second control channel subset that are configured for the second time period for the downlink control channel transmission to the wireless device.

14. The wireless device of claim 8, wherein the wireless device is further operable to:

receive one or more soft DRX parameters from the base station, the one or more soft DRX parameters comprising information that defines the two or more control channel subsets for the two or more time periods within the DRX awake period, respectively.

* * * * *